US012399952B2

(12) United States Patent
Raghavan et al.

(10) Patent No.: US 12,399,952 B2
(45) Date of Patent: Aug. 26, 2025

(54) RESILIENCE DETERMINATION AND DAMAGE RECOVERY IN NEURAL NETWORKS

(71) Applicant: California Institute of Technology, Pasadena, CA (US)

(72) Inventors: Guruprasad Raghavan, Pasadena, CA (US); Matthew W. Thomson, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 989 days.

(21) Appl. No.: 17/349,743

(22) Filed: Jun. 16, 2021

(65) Prior Publication Data
US 2021/0397964 A1 Dec. 23, 2021

Related U.S. Application Data

(60) Provisional application No. 63/039,749, filed on Jun. 16, 2020.

(51) Int. Cl.
| | |
|---|---|
| *G06F 17/11* | (2006.01) |
| *G06F 17/17* | (2006.01) |
| *G06F 18/2135* | (2023.01) |
| *G06N 3/045* | (2023.01) |
| *G06N 3/082* | (2023.01) |
| *G06V 10/764* | (2022.01) |
| *G06V 10/82* | (2022.01) |
| *G06V 30/19* | (2022.01) |

(52) U.S. Cl.
CPC .............. *G06F 17/11* (2013.01); *G06F 17/17* (2013.01); *G06F 18/21355* (2023.01); *G06N 3/045* (2023.01); *G06N 3/082* (2013.01); *G06V 10/764* (2022.01); *G06V 10/82* (2022.01); *G06V 30/19173* (2022.01)

(58) Field of Classification Search
CPC .... G06F 17/11; G06F 18/21355; G06F 17/17; G06V 10/82; G06V 10/764; G06V 30/19173; G06N 3/045; G06N 3/082
See application file for complete search history.

(56) References Cited

U.S. PATENT DOCUMENTS

| | | | | |
|---|---|---|---|---|
| 5,636,326 A | * | 6/1997 | Stork | G01N 33/005 706/25 |
| 2019/0244103 A1 | * | 8/2019 | Wang | G06N 3/088 |
| 2019/0354865 A1 | * | 11/2019 | Reisser | G06N 3/082 |

OTHER PUBLICATIONS

Arvanitidis, Georgios, et al. "Fast and robust shortest paths on manifolds learned from data." The 22nd International Conference on Artificial Intelligence and Statistics. PMLR, 2019. (Year: 2019).*
Lecun, Yann, John Denker, and Sara Solla. "Optimal brain damage." Advances in neural information processing systems 2 (1989). (Year: 1989).*

(Continued)

*Primary Examiner* — Miranda M Huang
*Assistant Examiner* — Isis Marie Black
(74) *Attorney, Agent, or Firm* — Dickinson Wright PLLC

(57) ABSTRACT

Disclosed herein include systems, devices, computer readable media, and methods for resilience determination and damage recovery in neural networks using a weight space and a metric that together form a manifold (such as a pseudo-Riemannian manifold or a Riemannian manifold).

19 Claims, 18 Drawing Sheets

(56) References Cited

OTHER PUBLICATIONS

Masci, Jonathan, et al. "Geodesic convolutional neural networks on riemannian manifolds." Proceedings of the IEEE international conference on computer vision workshops. 2015. (Year: 2015).*
Russell, Stuart J., and Peter Norvig, Artificial Intelligence: A Modern Approach, 2nd Ed., 2003, chapter 20, p. 736-748 (Year: 2003).*
Arechiga & Michaels, "The Robustness of Modern Deep Learning Architectures against Single Event Upset Errors," IEEE 2018, in 6 pages.
Arlotta & Berninger, "Brains in metamorphosis: reprogramming cell identity within the central nervous system," Current Opinion in Neuroloogy 2014, 208-214.
Castor & Massioui, "Resilience after a neurological pathology: What impact on the cognitive abilities of patients with brain damage?," Neuropsychological Rehabilitation 2020, 30(5), 853-871.
Cheney et al., "On the Robustness of Convolutional Neural Networks to Internal Architecture and Weight Perturbations," arXiv 2017, 08245v1, in 9 pages. https://arxiv.org/abs/1703.08245v1.
Firesmith, "System Resilience: What Exactly is it?," Software Engineering Institute Blog 2019, in 5 pages. https://insights.sei.cmu.edu/sei_blog/2019/11/system-resilience-what-exactly-is-it.html.
Frankle & Carbin, "The Lottery Ticket Hypothesis: Finding Sparse, Trainable Neural Networks," arXiv 2019, 03635v5 in 42 pages. https://arxiv.org/abs/1803.03635v5.
Fukushima, "Neocognitron: A Self-Organizing Neural Network Model for a Mechanism of Pattern Recognition Unaffected by Shift in Position," Biological Cybernetics 1980, 36(4), 193-202.
Gilbert & Li, "Adult Visual Cortical Plasticity," Neuron 2012, 75(2), 250-264.
Gonzalez et al., "Persistence of neuronal representations through time and damage in the hippocampus," Science 2019, 365, 821-825.
Hammerschmidt et al., "Mice lacking the cerebral cortex develop normal song: Insights into the foundations of vocal learning," Scientific Reports 2015, 5(8808) 1-7.
Han et al., "Learning Both Weights and Connections for Efficient Neural Network," arXiv 2015, 02626v3, in 9 pages. https://arxiv.org/abs/1506.02626.
Hendrycks & Dietterich, "Benchmarking Neural Network Robustness to Common Corruptions and Perturbations," arXiv 2019, 12261v1, in 16 pages. https://arxiv.org/abs/1903.12261.
Hong et al., "Sensation, Movement and Learning in the Absence of Barrel Cortex," Nature 2018, 561(7724), 542-546.
Iliadis et al., "Brain-inspired computing and machine learning," Neural Computing and Applications 2020, 32, 6641-6643.
Keck et al., "Synaptic Scaling and Homeostatic Plasticity in the Mouse Visual Cortex in Vivo," Neuron 2013, 80, 327-334.
Lecun et al., "Gradient-Based Learning Applied to Document Recognition," Proceedings of the IEEE 1998, 86(11), 2278-2324.
Lewin, "Is Your Brain Really Necessary?," Science 1980, 210(4475), 1232-1234.
Li et al., "Understanding Error Propagation in Deep Learning Neural Network (DNN) Accelerators and Applications," The International Conference for High Performance Computing, Networking, Storage and Analysis 2017, in 12 pages.
Mach, "Mobile Edge Computing: A Survey on Architecture and Computation Offloading," IEEE Communications Surveys and Tutorials 2017, 19(3), 1628-1656.
Mache et al., "Trends and Applications in Constructive Approximation," 2006, 151, 286 pages.
Marder & Goaillard, "Variability, compensation and homeostasis in neuron and network function," Nature Reviews Neuroscience 2007, 7, 563-574.
Monroe, "Neuromorphic Computing Gets Ready for the (Really) Big Time," Communications of the ACM 2014, 57(6), 13-15.
Morcos et al., "On the Importance of Single Directions for Generalization," arXiv 2018, 06959v4, in 15 pages. https://arxiv.org/abs/1803.06959.
Murphy & Corbett, "Plasticity during stroke recovery: from synapse to behaviour," Nature Reviews Neuroscience 2009, 10, 861-872.
Raghavan et al., "Geometric algorithms for predicting resilience and recovering damage in neural networks," arXiv 2005, 11603v2, in 10 pages. https://arxiv.org/abs/2005.11603v2.
Richter et al., "Resilience to Adversity is Associated with Increased Activity and Connectivity in the VTA and Hippocampus," NeuroImage: Clinical 2019, 23(101920), in 10 pages.
Schroeder et al., "DRAM Errors in the Wild: A Large-Scale Field Study," ACM 2009, 193-204.
Scoville & Milner, "Loss of Recent Memory After Bilateral Hippocampal Lesions," Journal of Neurology, Neurosurgery and Psychiatry 1957, 20(1), 11-21.
Simonyan & Zisserman, "Very Deep Convolutional Networks for Large-Scale Image Recognition," arXiv 2014, 1556v4, in 13 pages. https://arxiv.org/abs/1409.1556v4.
Srinivasan & Stevens, "Robustness and Fault Tolerance Make Brains Harder to Study," BMC Biology 2011, 9(46), in 3 pages.
Thorne et al., "Gravitation," Freeman 2000, in 1340 pages.
Tu, "An Introduction to Manifolds," Second Edition Springer 2011, in 430 pages.
Tu, "Differential Geometry: Connections, Curvature, and Characteristic Classes," Springer 2017, 275, in 358 pages.
Wolczyk et al., "Biologically-Inspired Spatial Neural Networks," arXiv 2019, 02776v1, in 5 pages. https://arxiv.org/pdf/1910.02776v1.
Zador, "A Critique of Pure Learning and What Artificial Neural Networks Can Learn from Animal Brains," Nature Communications 2019, 10(3770), 1-7.
Gates et al., "Chapter 7 Reconstruction of cortical circuitry," Progress in Brain Research 2000, 127, 115-156, Publisher Summary.
Taimanov, "Lectures on Differential Geometry," European Mathematical Society/American Mathematical Society 2008, 211 pages, Table of Contents.

* cited by examiner

Local damage

Global damage

RESILIENCE DETERMINATION AND DAMAGE RECOVERY IN NEURAL NETWORKS

CROSS-REFERENCE TO RELATED APPLICATIONS

This application claims the benefit of priority to U.S. patent application No. 63/039,749, filed on Jun. 16, 2020, the content of which is incorporated herein by reference in its entirety.

BACKGROUND

Field

This disclosure relates generally to the field of neural networks, and more particularly to resilience determination and damage recovery in machine learning models such as neural networks.

Background

Despite the importance of resilience in technology applications, the resilience of artificial neural networks is poorly understood, and autonomous recovery algorithms have yet to be developed. There is a need to endow artificial systems with resilience and rapid-recovery routines to enable their deployment for critical applications.

SUMMARY

Disclosed herein include methods for updating weights of a neural network. In some embodiments, a method for updating weights of a neural network is under control of a processor (e.g., a hardware processor or a virtual processor) and comprises: (a) providing (or receiving) a neural network comprising a plurality of weights. The method can comprise: (b) determining one or more weights of the plurality of weights of the neural network are damaged. The method can comprise: (c) determining first updated weights corresponding to one or more weights of the plurality of weights of the neural network that are undamaged using a geodesic path in a weight space comprising the plurality of weights of the neural network. The method can comprise: (d) updating the weights that are undamaged with the first updated weights to generate a first updated neural network.

Disclosed herein include methods of for updating weights of a neural network. In some embodiments, a method for updating weights of a neural network is under control of a processor (e.g., a hardware processor or a virtual processor) and comprises: (a) providing (or receiving) a neural network comprising a plurality of weights. One or more weights of the plurality of weights of the neural network can be damaged. The method can comprise: (c) determining first updated weights corresponding to one or more weights of the plurality of weights of the neural network that are undamaged using a geodesic path in a weight space comprising the plurality of weights of the neural network. The method can comprise: (d) updating the weights that are undamaged with the first updated weights to generate a first updated neural network.

Disclosed herein include methods of for updating weights of a neural network. In some embodiments, a method for updating weights of a neural network is under control of a processor (e.g., a hardware processor or a virtual processor) and comprises: (a) providing (or receiving) a neural network comprising a plurality of weights. One or more first weights of the plurality of weights of the neural network can be damaged. The method can comprise: (c) determining first updated weights corresponding to one or more weights of the plurality of weights of the neural network that are undamaged using a geodesic path in a weight space comprising the plurality of weights of the neural network. The method can comprise: (d) updating the weights of the neural network that are undamaged with the first updated weights to generate a first updated neural network. Subsequent to (d), second weights of the plurality of weights of the first updated neural network may be damaged. The method can comprise: (c2) determining second updated weights corresponding to one or more weights of the plurality of weights of the first updated neural network that are undamaged subsequent to (d) using a geodesic path in the weight space. The method can comprise: (d2) updating the weights of the first updated neural network that are undamaged with the second updated weights to generate a second updated neural network.

In some embodiments, determining the first updated weights (or any updated weights of the present disclosure) comprises determining the geodesic path using a geodesic equation. In some embodiments, determining the first updated weights (or any updated weights of the present disclosure) comprises determining an approximation of the geodesic path using an approximation of the geodesic equation. The approximation of the geodesic equation can comprise a first order expansion of a loss function, optionally wherein the first order expansion comprises a Taylor expansion. Determining the first updated weights (or any updated weights of the present disclosure) can comprises determining the approximation of the geodesic equation using a metric (or a metric tensor). The metric can comprise a Riemannian metric, a pseudo-Riemannian metric, or a non-Euclidean metric. The combination of the weight space and the metric can comprise a Riemannian manifold or a pseudo-Riemannian manifold. The metric can comprise a positive semi-definite, symmetric matrix or a positive definite, symmetric matrix. The metric tensor can comprise a symmetric matrix, wherein the metric tensor is definite or semi-definite, wherein the metric is bilinear, and/or wherein the metric tensor is positive, or a combination thereof. The weight space can comprise a manifold, wherein the weight space comprises a smooth manifold, and/or wherein the weight space is homeomorphic to a Euclidean space.

In some embodiments, determining the first updated weights (or any updated weights of the present disclosure) comprises: determining a plurality of approximations of the geodesic path using an approximation of the geodesic equation. Determining the first updated weights (or any updated weights of the present disclosure) can comprise: selecting one of the plurality of approximations of the geodesic path as a best approximation of the geodesic path. The best approximation of the geodesic path can have a shortest total length amongst the plurality of approximations of the geodesic path to a damage hyperplane.

In some embodiments, the method comprises, prior to determining the one or more weights are damaged: receiving a first input. The method can comprise: determining a first output from the first input using the neural network. In some embodiments, determining the first output from the first input using the neural network (or any output from any input using any neural network of the present disclosure) corresponds to a task. The task comprises a computation processing task, an information processing task, a sensory input processing task, a storage task, a retrieval task, a decision task, an image recognition task, and/or a speech recognition task. In some embodiments, the first input comprises an image. The task can comprise an image recognition task.

In some embodiments, the method comprises, subsequent to updating the weights that are undamaged with the first updated weights: receiving a second input. The method can comprise: determining a second output from the second input using the first updated neural network.

In some embodiments, determining the first updated weights and updating the weights that are undamaged with the first updated weights are performed iterative for at least two iterations. In some embodiments, the method comprises, subsequent to subsequent to updating the weights that are undamaged with the first updated weights: (c2) determining second updated weights corresponding to second weights of the plurality of weights of the neural network that are undamaged using the geodesic path in the weight space. The method can comprise: (d2) updating the second weights that are undamaged with the second updated weights to generate a second updated neural network. In some embodiments, the second updated neural network is on a damage hyperplane. In some embodiments, the first updated neural network is on a damage hyperplane. In some embodiments, the method comprises, subsequent to updating the second weights that are undamaged with the second updated weights: receiving a third input. The method can comprise: determining a third output from the third input using the second updated neural network.

In some embodiments, the neural network when provided comprises no weight that is damaged. In some embodiments, the neural network when provided comprises at least one weight that is damaged. In some embodiments, one or more of the one or more weights have values other than zeros when undamaged. In some embodiments, one or more the one or more weights have values of zeros when damaged. In some embodiments, the method comprises setting the weights that are damaged to values of zeros.

In some embodiments, an accuracy of the neural network comprising no weight that is damaged is at least 90%. In some embodiments, an accuracy of the neural network comprising the weights that are damaged is at most 80%. In some embodiments, an accuracy of the neural network comprising the weights that are damaged is at most 90% of an accuracy of the neural network comprising no weight that is damaged. In some embodiments, an accuracy of the first updated neural network is at least 85%. In some embodiments, an accuracy of the neural network comprising the weights that are damaged is at most 90% of an accuracy of the first updated neural network. In some embodiments, an accuracy of the first updated neural network is at most 99% of an accuracy of the second updated neural network. In some embodiments, the weights of the plurality of weights of the neural network that are damaged comprises at least 5% of the plurality of weights of the neural network.

In some embodiments, the neural network comprises at least 100 weights. In some embodiments, the neural network comprises at least 25 nodes. In some embodiments, the neural network comprises at least 2 layers. In some embodiments, the neural network comprises a convolutional neural network (CNN), a deep neural network (DNN), a multilayer perceptron (MLP), or a combination thereof.

Disclosed herein include systems or devices. In some embodiments, a system or a device comprises non-transitory memory configured to store executable instructions and a neural network of the present disclosure. The system can comprise a processor (e.g., a hardware processor or a virtual processor) programmed by the executable instructions to perform: determining one or more weights of the plurality of weights of the neural network are damaged. The processor can be programmed by the executable instructions to perform: determining first updated weights corresponding to one or more weights of the plurality of weights of the neural network that are undamaged using a geodesic path in a weight space comprising the plurality of weights of the neural network. The processor can be programmed by the executable instructions to perform: updating the weights that are undamaged with the first updated weights to generate a first updated neural network. The non-transitory memory can be configured to store the first updated neural network.

Disclosed herein include systems or devices. In some embodiments, a system or a device comprises non-transitory memory configured to store executable instructions and a neural network of the present disclosure. One or more first weights of the plurality of weights of the neural network can be damaged. The system can comprise a processor (e.g., a hardware processor or a virtual processor) programmed by the executable instructions to perform: determining first updated weights corresponding to one or more weights of the plurality of weights of the neural network that are undamaged using a geodesic path in a weight space comprising the plurality of weights of the neural network. The processor can be programmed by the executable instructions to perform: updating the weights of the neural network that are undamaged with the first updated weights to generate a first updated neural network. Second weights of the plurality of weights of the first updated neural network may be damaged subsequent to the first updated weights are determined. The processor can be programmed by the executable instructions to perform: determining second updated weights corresponding to one or more weights of the plurality of weights of the first updated neural network, that are undamaged subsequent to the first updated weights are determined, using a geodesic path in the weight space. The processor can be programmed by the executable instructions to perform: updating the weights of the first updated neural network that are undamaged with the second updated weights to generate a second updated neural network.

In some embodiments, determining the first updated weights (or any updated weights of the present disclosure) comprises determining the geodesic path using a geodesic equation. In some embodiments, determining the first updated weights (or any updated weights of the present disclosure) comprises determining an approximation of the geodesic path using an approximation of the geodesic equation. The approximation of the geodesic equation can comprise a first order expansion of a loss function, optionally wherein the first order expansion comprises a Taylor expansion. Determining the first updated weights (or any updated weights of the present disclosure) can comprises determining the approximation of the geodesic equation using a metric (or a metric tensor). The metric can comprise a Riemannian metric, a pseudo-Riemannian metric, or a non-Euclidean metric. The combination of the weight space and the metric can comprise a Riemannian manifold or a pseudo-Riemannian manifold. The metric can comprise a positive semi-definite, symmetric matrix or a positive definite, symmetric matrix. The metric tensor can comprise a symmetric matrix, wherein the metric tensor is definite or semi-definite, wherein the metric is bilinear, and/or wherein the metric tensor is positive, or a combination thereof. The weight space can comprise a manifold, wherein the weight space comprises a smooth manifold, and/or wherein the weight space is homeomorphic to a Euclidean space.

In some embodiments, determining the first updated weights (or any updated weights of the present disclosure) comprises: determining a plurality of approximations of the geodesic path using an approximation of the geodesic equation. Determining the first updated weights (or any updated weights of the present disclosure) can comprise: selecting one of the plurality of approximations of the geodesic path as a best approximation of the geodesic path. The best approximation of the geodesic path can have a shortest total length amongst the plurality of approximations of the geodesic path to a damage hyperplane.

In some embodiments, the processor is programmed by the executable instructions to perform, prior to determining the one or more weights are damaged: receiving a first input. The processor can be programmed by the executable instructions to perform: determining a first output from the first input using the neural network. In some embodiments, determining the first output from the first input using the neural network (or any output from any input using any neural network of the present disclosure)) corresponds to a task. The task comprises a computation processing task, an information processing task, a sensory input processing task, a storage task, a retrieval task, a decision task, an image recognition task, and/or a speech recognition task. In some embodiments, the first input comprises an image. The task can comprise an image recognition task.

In some embodiments, the processor is programmed by the executable instructions to perform: subsequent to updating the weights that are undamaged with the first updated weights: receiving a second input. The processor can be programmed by the executable instructions to perform: determining a second output from the second input using the first updated neural network.

In some embodiments, determining the first updated weights and updating the weights that are undamaged with the first updated weights are performed iterative for at least two iterations. In some embodiments, the processor can be programmed by the executable instructions to perform, subsequent to subsequent to updating the weights that are undamaged with the first updated weights: (c2) determining second updated weights corresponding to second weights of the plurality of weights of the neural network that are undamaged using the geodesic path in the weight space. the processor can be programmed by the executable instructions to perform: (d2) updating the second weights that are undamaged with the second updated weights to generate a second updated neural network. In some embodiments, the second updated neural network is on a damage hyperplane. In some embodiments, the first updated neural network is on a damage hyperplane. In some embodiments, the processor is programmed by the executable instructions to perform: subsequent to updating the second weights that are undamaged with the second updated weights: receiving a third input. The processor can be programmed by the executable instructions to perform: determining a third output from the third input using the second updated neural network.

In some embodiments, the neural network when provided comprises no weight that is damaged. In some embodiments, the neural network when provided comprises at least one weight that is damaged. In some embodiments, one or more of the one or more weights have values other than zeros when undamaged. In some embodiments, one or more the one or more weights have values of zeros when damaged. In some embodiments, the processor is programmed by the executable instructions to perform: setting the weights that are damaged to values of zeros.

In some embodiments, an accuracy of the neural network comprising no weight that is damaged is at least 90%. In some embodiments, an accuracy of the neural network comprising the weights that are damaged is at most 80%. In some embodiments, an accuracy of the neural network comprising the weights that are damaged is at most 90% of an accuracy of the neural network comprising no weight that is damaged. In some embodiments, an accuracy of the first updated neural network is at least 85%. In some embodiments, an accuracy of the neural network comprising the weights that are damaged is at most 90% of an accuracy of the first updated neural network. In some embodiments, an accuracy of the first updated neural network is at most 99% of an accuracy of the second updated neural network. In some embodiments, the weights of the plurality of weights of the neural network that are damaged comprises at least 5% of the plurality of weights of the neural network.

In some embodiments, the neural network comprises at least 100 weights. In some embodiments, the neural network comprises at least 25 nodes. In some embodiments, the neural network comprises at least 2 layers. In some embodiments, the neural network comprises a convolutional neural network (CNN), a deep neural network (DNN), a multilayer perceptron (MLP), or a combination thereof In some embodiments, the system comprises is comprised an edge device, an internet of things (IoT) device, a real-time image analysis system, a real-time sensor analysis system, an autonomous driving system, an autonomous vehicle, a robotic control system, a robot, or a combination thereof. In some embodiments, the processor comprises a neuromorphic processor.

Disclosed herein includes computer readable media. In some embodiments, a computer readable medium comprises executable instructions, when executed by a hardware processor of a computing system or a device, cause the hardware processor, to perform any method disclosed herein.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 1A shows three networks ($N_1$, $N_2$, $N_3$) in weights space W and their relative distance in functional space and loss space. Damage is analyzed by asking how movement in weight space changes functional performance and loss through introduction of a pullback metric g. FIG. 1B shows local damage is considered to a network as an infinitesimal perturbation that can be analyzed in the tangent space of a trained network. FIG. 1C shows global damage is modeled as long range movement of network weights along a path, $\gamma(t)$, in weight space.

FIG. 2A shows spectra of the metric tensor for MLP-1, MLP-2 and VGG-11. FIG. 2B-FIG. 2C show test performance of networks perturbed within a unit-ball in W (FIG. 2B) perturbed VGG-11 trained on CIFAR-10, (FIG. 2C) perturbed MLP-2 trained on MNIST. FIG. 2D-FIG. 2E show designing adversarial perturbations to destroy trained networks' performance. FIG. 2D shows adversarial perturbation within unit-ball in W lowers accuracy to 13% in VGG-11. FIG. 2E shows adversarial weight perturbation within unit-ball in W lowers accuracy to 70% in MLP-2.

FIG. 3C-FIG. 3E show damage paths in manifold (W, g). FIG. 3C is a cartoon of the loss landscape showing multiple breakdown paths from the trained network to the damaged network. FIG. 3D-FIG. FIG. 3E show the covariant derivative of the accuracy along multiple damage paths for (FIG. 3D) MLP-2 and (FIG. 3E) VGG-11 are shown. A steep increase in the covariant derivative (acceleration) along damage paths corresponds to the networks' sharp break-down to global damage. FIG. 3F shows multiple damage paths (colored lines) shown from trained MLP-2 (N1) to its damaged counter-part (N2). The z-axes is the test-accuracy of the networks, while x,y axes are the isomap embedding of networks in a 2D space.

FIG. 4A shows test accuracy of geodesic recovery paths (blue) versus naive damage paths (red) for VGG-1 network while 30 convolution filters and 1000 nodes from fully-connected layers are damaged. While the naive path exhibits sharp break-down, the geodesic method adjusts undamaged weights to maintain test accuracy. FIG. 4B shows magnitude of the covariant derivative (break-down acceleration) for geodesic (blue) and naive damage paths (red). FIG. 4C-FIG. 4D show test accuracy (FIG. 4C) and number of network update epochs (FIG. 4D) for geodesic recovery (blue) vs fine-tuning (green) while 50 (out of 60) conv-filters are deleted from layer1 in VGG-11. Geodesic recovery requires <10 total update epochs. FIG. 4E depicts multiple recovery paths on the loss landscape from trained network (N1) to networks on the damage hyper-plane (N2, N3, N4, N5). The z-axes is network-loss, while the x,y axes are neural net weights. FIG. 4F. The geodesic method (blue) allows networks to dynamically transition between configurations: C1, trained VGG-11 network ; C2, 50 conv-filters removed from C1; C3, 1000 additional nodes removed from classifier-layers in C2; C4, 30 conv-filters in conv-layer1 restored to C3. Dynamic transitioning enabled within 5 epochs. The naive method is shown in red).

FIG. 7A shows multiple recovery paths on the loss landscape from trained network (N1) to networks on the damage hyper-plane (N2, N3, N4, N5). The z-axes is network-loss, while the x,y axes are neural net weights. FIG. 7B shows test accuracy of geodesic recovery paths (blue) versus naive damage paths (red) for MLP-2 network while 250 nodes from hidden-layer 1 and 50 nodes from hidden-layer 2 are damaged. While the naive path exhibits sharp break-down, the geodesic method adjusts undamaged weights to maintain test accuracy. FIG. 7C shows magnitude of the covariant derivative (breakdown acceleration) for geodesic (blue) and naive damage paths (red).

Figure 1A:
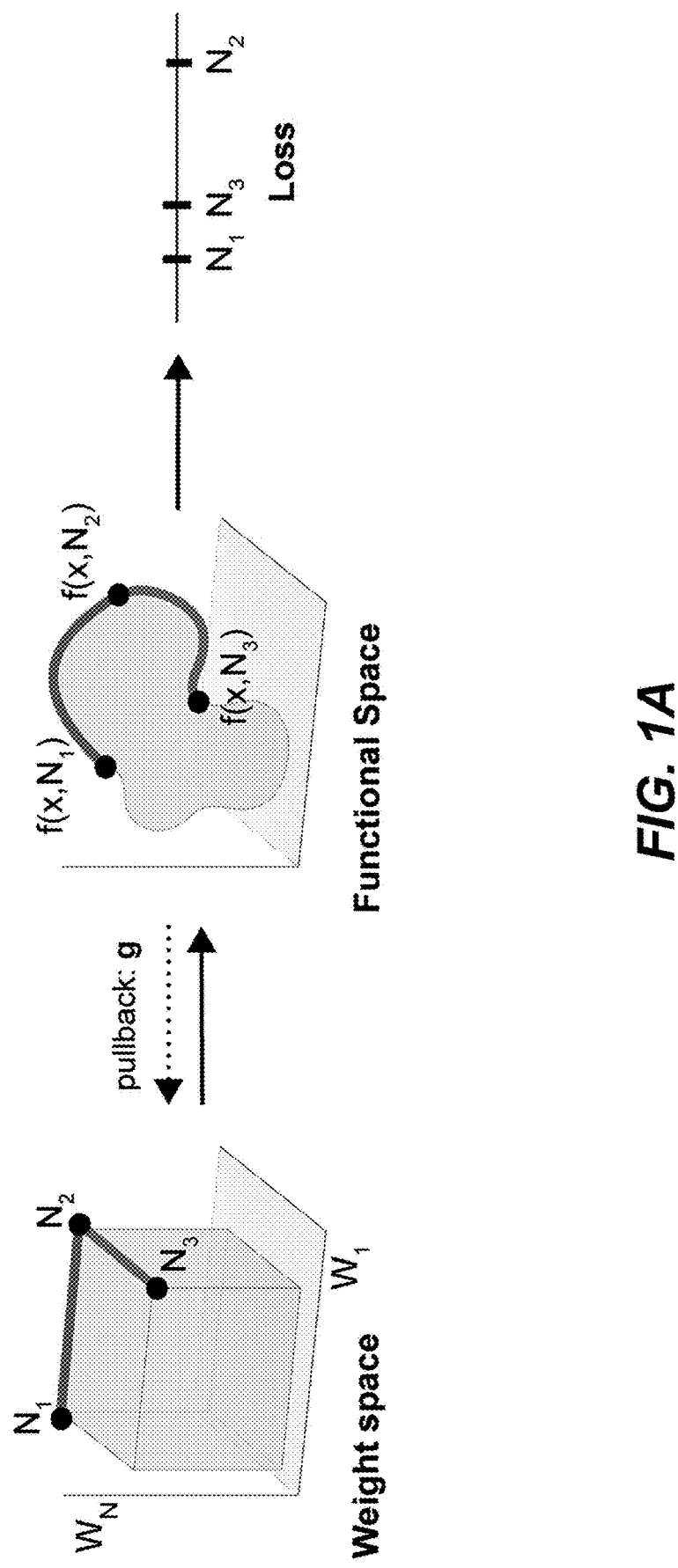
FIG. 1A-FIG. 1C depict a geometric framework for analyzing neural network resilience.

Throughout the drawings, reference numbers may be re-used to indicate correspondence between referenced elements. The drawings are provided to illustrate example embodiments described herein and are not intended to limit the scope of the disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

All patents, published patent applications, other publications, and sequences from GenBank, and other databases referred to herein are incorporated by reference in their entirety with respect to the related technology.

Disclosed herein include methods for updating weights of a neural network. In some embodiments, a method for updating weights of a neural network is under control of a processor (e.g., a hardware processor or a virtual processor) and comprises: (a) providing (or receiving) a neural network comprising a plurality of weights. The method can comprise: (b) determining one or more weights of the plurality of weights of the neural network are damaged. The method can comprise: (c) determining first updated weights corresponding to one or more weights of the plurality of weights of the neural network that are undamaged using a geodesic path in a weight space comprising the plurality of weights of the neural network. The method can comprise: (d) updating the weights that are undamaged with the first updated weights to generate a first updated neural network.

Disclosed herein include methods of for updating weights of a neural network. In some embodiments, a method for updating weights of a neural network is under control of a processor (e.g., a hardware processor or a virtual processor) and comprises: (a) providing (or receiving) a neural network comprising a plurality of weights. One or more weights of the plurality of weights of the neural network can be damaged. The method can comprise: (c) determining first updated weights corresponding to one or more weights of the plurality of weights of the neural network that are undamaged using a geodesic path in a weight space comprising the plurality of weights of the neural network. The method can comprise: (d) updating the weights that are undamaged with the first updated weights to generate a first updated neural network.

Disclosed herein include methods of for updating weights of a neural network. In some embodiments, a method for updating weights of a neural network is under control of a processor (e.g., a hardware processor or a virtual processor) and comprises: (a) providing (or receiving) a neural network comprising a plurality of weights. One or more first weights of the plurality of weights of the neural network can be damaged. The method can comprise: (c) determining first updated weights corresponding to one or more weights of the plurality of weights of the neural network that are undamaged using a geodesic path in a weight space comprising the plurality of weights of the neural network. The method can comprise: (d) updating the weights of the neural network that are undamaged with the first updated weights to generate a first updated neural network. Subsequent to (d), second weights of the plurality of weights of the first updated neural network may be damaged. The method can comprise: (c2) determining second updated weights corresponding to one or more weights of the plurality of weights of the first updated neural network that are undamaged subsequent to (d) using a geodesic path in the weight space. The method can comprise: (d2) updating the weights of the first updated neural network that are undamaged with the second updated weights to generate a second updated neural network.

Disclosed herein include systems or devices. In some embodiments, a system or a device comprises non-transitory memory configured to store executable instructions and a neural network of the present disclosure. The system can comprise a processor (e.g., a hardware processor or a virtual processor) programmed by the executable instructions to perform: determining one or more weights of the plurality of weights of the neural network are damaged. The processor can be programmed by the executable instructions to perform: determining first updated weights corresponding to one or more weights of the plurality of weights of the neural network that are undamaged using a geodesic path in a weight space comprising the plurality of weights of the neural network. The processor can be programmed by the executable instructions to perform: updating the weights that are undamaged with the first updated weights to generate a first updated neural network. The non-transitory memory can be configured to store the first updated neural network.

Disclosed herein include systems or devices. In some embodiments, a system or a device comprises non-transitory memory configured to store executable instructions and a neural network of the present disclosure. One or more first weights of the plurality of weights of the neural network can be damaged. The system can comprise a processor (e.g., a hardware processor or a virtual processor) programmed by the executable instructions to perform: determining first updated weights corresponding to one or more weights of the plurality of weights of the neural network that are undamaged using a geodesic path in a weight space comprising the plurality of weights of the neural network. The processor can be programmed by the executable instructions to perform: updating the weights of the neural network that are undamaged with the first updated weights to generate a first updated neural network. Second weights of the plurality of weights of the first updated neural network may be damaged subsequent to the first updated weights are determined. The processor can be programmed by the executable instructions to perform: determining second updated weights corresponding to one or more weights of the plurality of weights of the first updated neural network, that are undamaged subsequent to the first updated weights are determined, using a geodesic path in the weight space. The processor can be programmed by the executable instructions to perform: updating the weights of the first updated neural network that are undamaged with the second updated weights to generate a second updated neural network.

Disclosed herein include systems or devices. In some embodiments, a system or a device comprises non-transitory memory configured to store executable. The system can comprise a processor (e.g., a hardware processor or a virtual processor) programmed by the executable instructions to perform: any method of the disclosure. Disclosed herein includes computer readable media. In some embodiments, a computer readable medium comprises executable instructions, when executed by a hardware processor of a computing system or a device, cause the hardware processor, to perform any method disclosed herein.

Geometric Algorithms for Predicting Resilience and Recovering Damage in Machine Learning Models Biological neural networks have evolved to maintain performance despite significant circuit damage. To survive damage, biological network architectures have both intrinsic resilience to component loss and also activate recovery programs that adjust network weights through plasticity to stabilize performance. Despite the importance of resilience in technology applications, the resilience of artificial neural networks is poorly understood, and autonomous recovery algorithms have yet to be developed. The present disclosure provides is a mathematical framework to analyze the resilience of artificial neural networks through the lens of differential geometry. The geometric language disclosed herein provides natural algorithms that identify local vulnerabilities in trained networks as well as recovery algorithms that dynamically adjust networks to compensate for damage. The present disclosure shows striking weight perturbation vulnerabilities in common image analysis architectures, including Multi-Layer Perceptrons (MLPs) and Convolutional Neural Networks (CNNs) trained on MNIST and CIFAR-10 respectively. Methods to uncover high-performance recovery paths that enable the same networks to dynamically re-adjust their parameters to compensate for damage are provided. The present disclosure provides methods that endow artificial systems with resilience and rapid-recovery routines to enable their deployment for critical applications.

Brains are remarkable machines whose computational capabilities have inspired many breakthroughs in machine learning. However, the resilience of the brain, its ability to maintain computational capabilities in harsh conditions and following circuit damage, remains poorly developed in current artificial intelligence paradigms. Biological neural networks are known to implement redundancy and other architectural features that allow circuits to maintain performance following loss of neurons or lesion to sub-circuits. In addition to architectural resilience, biological neural networks execute recovery programs that allow circuits to repair themselves through the activation of network plasticity following damage. For example, recovery algorithms reestablish olfactory and visual behaviors in mammals following sensory specific cortical circuit lesions. Through resilience and recovery mechanisms, biological neural networks can maintain steady performance in the face of dynamic challenges like changing external environments, cell damage, partial circuit loss as well as catastrophic injuries like the loss of large sections of the cortex.

Like brains, artificial neural networks must increasingly execute critical applications that require robustness to both hardware component damage and memory errors that could corrupt network weights. Network robustness to soft errors that can lead to weight corruption and network failure is important in applications including (i) decision-making in the healthcare industry, (ii) image and sensor analysis in self-driving cars and (iii) robotic control systems. Errors in dynamic access memory can occur due to malicious attacks (the RowHammer), but a particular focus has been on errors induced by high energy particles that occur at surprising rates. Further, the rising implementation of neural networks on physical hardware (like neuromorphic, edge devices), where networks can be disconnected from the internet and are under control of an end user, necessitates the need for damage-resilient and dynamically recovering artificial neural networks.

The resilience of living neural networks motivates theoretical and practical efforts to understand the resilience of artificial neural networks and to design new algorithms that reverse engineer resilience and recovery into artificial systems. Studies have demonstrated empirically that MLP and CNN architectures can be surprisingly robust to large scale node deletion. However, there is currently little understanding of the empirically observed resilience or what ultimately causes networks to fail. Mathematical frameworks are important for understanding the resilience neural networks and for developing recovery methods that can maintain network performance during damage.

A mathematical framework grounded in differential geometry is disclosed herein for studying the resilience and the recovery of artificial neural nets. Damage/response behavior is formalized as dynamic movement on a curved pseudo-Riemannian manifold. Geometric language provides new methods for identifying network vulnerabilities by predicting local perturbations that adversely impact the functional performance of the network. Further, it is demonstrated that geodesics, minimum length paths, on the weight manifold provide high performance recovery paths that the network can traverse to maintain performance while damaged. The algorithms disclosed herein allow networks to maintain high-performance during rounds of damage and repair through computationally efficient weight-update algorithms that do not require conventional retraining. In some embodiments, the present disclosure provides methods that help endow artificial systems with resilience and autonomous recovery policies to emulate the properties of biological neural networks.

Analyzing Network Resilience with Differential Geometry

A geometric framework is disclosed herein for understanding how artificial neural networks (or machine learning models in general) respond to damage using differential geometry to analyze changes in functional performance given changes in network weights. Layered neural networks have intrinsic robustness properties. A geometric approach is provided herein for understanding robustness as arising from underlying geometric properties of the weight manifold that are quantified by the metric tensor. The geometric approach allows for identification of vulnerabilities in common neural network architectures as well as defines new strategies for repairing damaged networks.

A feed-forward neural network can be represented as a smooth, $C^\infty$ function $f(x, w)$, that maps an input vector, $x \in ^k$, to an output vector, $f(x, w) = y \in \mathbb{R}^m$. A $C^\infty$ function is a function that is differentiable for all degrees of differentiation. The function, $f(x, w)$, is parameterized by a vector of weights, $w \in \mathbb{R}^n$, that are typically set in training to solve a specific task. W is referred to as the weight space (W) of the network, and $F = \mathbb{R}^m$ is referred to as the functional manifold. In addition to f, in some embodiments, a loss function is of interest, $L: \mathbb{R}^m \times \mathbb{R} \to \mathbb{R}$, that provides a scalar measure of network performance for a given task (FIG. 1A-FIG. 1C).

Figure 1B:
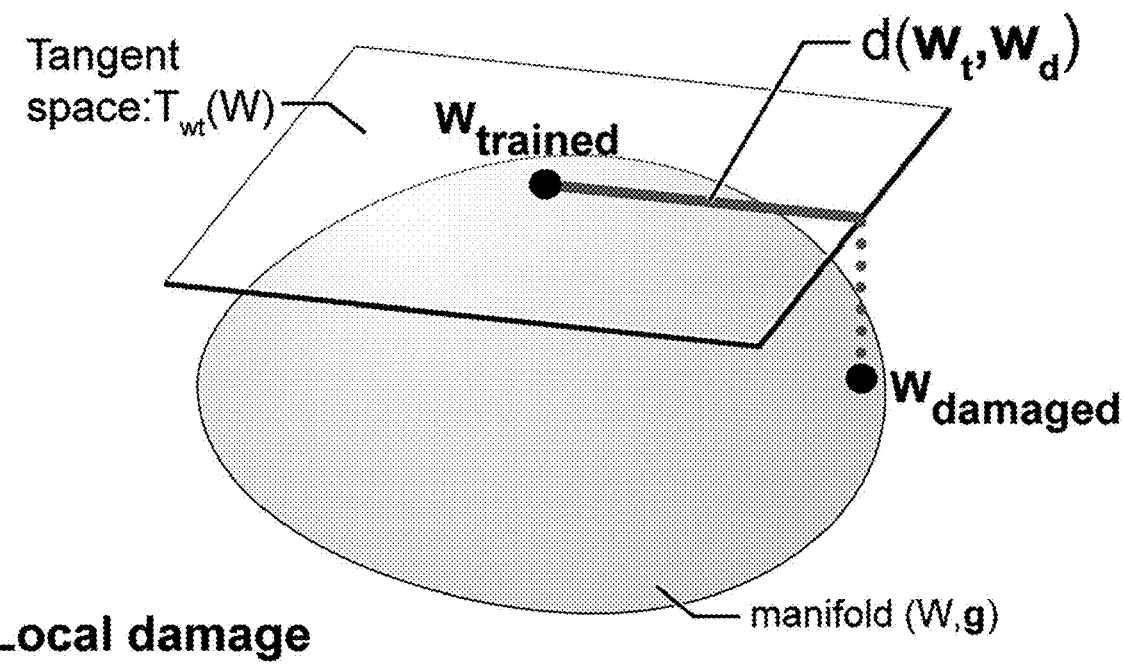
Figure 1C:
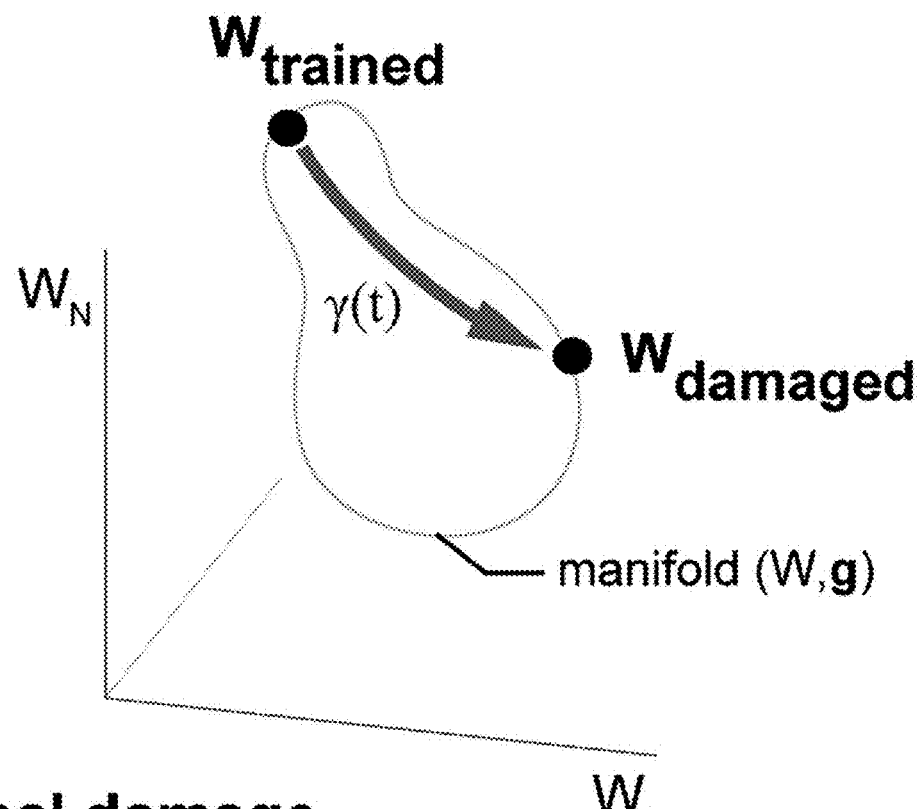

FIG. 1A-FIG. 1C depict a geometric framework for analyzing neural network resilience. FIG. 1A shows three networks ($N_1$, $N_2$, $N_3$) in weights space W and their relative distance in functional space and loss space. Damage is analyzed by asking how movement in weight space changes functional performance and loss through introduction of a pullback metric g. FIG. 1B shows local damage is considered to a network as an infinitesimal perturbation that can be analyzed in the tangent space of a trained network. FIG. 1C shows global damage is modeled as long range movement of network weights along a path, $\gamma(t)$, in weight space.

It may be asked how the performance of a trained neural network, $w_t$, will change when subjected to weight perturbation, shifting $w_{trained} \to w_{damaged}$. Differential geometry can be used to develop a mathematical theory, rooted in a functional notion of distance, to analyze how arbitrary weight perturbations $w_t \to w_d$ impact functional performance of a network. Specifically, a local distance metric is constructed, g, that can be applied at any point in W to measure the functional impact of an arbitrary network perturbation.

To construct a metric mathematically, the input, x, into a network is fixed and it is asked how the output of the network, $f(w, x)$, moves on the functional manifold, F, given an infinitesimal weight perturbation, du, in W where $w_d = w_t + du$. For an infinitesimal perturbation du, $$f(x, w_t + du) \approx f(x, w_t) + J_{w_t} du, \qquad (1)$$

where $J_{w_t}$ is the Jacobian of $f(x, w)$ for a fixed x, $$J_{i,j} = \frac{\partial f_i}{\partial w^j},$$

evaluated at $w_t$. The change in functional performance given du is measured as the mean squared error $$d(w_t, w_d) = |f(x, w_t) - f(x, w_d)|^2 \qquad (2)$$
$$= du^T (J_{w_t}^T J_{w_t}) du \qquad (3)$$
$$= du^T g_{w_t} du, \qquad (4)$$

where $g_{w_t} = J_{w_t}^T J_{w_t}$ is the metric tensor evaluated at the point $w_t \in W$. The metric tensor g is an n×n symmetric matrix that defines an inner product and local distance metric, $\langle du, du \rangle_w = du^T g_w du$, on the tangent space of the manifold, $T_w(W)$ at each $w \in W$.

Explicitly, $$g_{ij} = \sum_{k=1}^{m} \frac{\partial f_k(x, w)}{\partial w^i} \frac{\partial f_k(x, w)}{\partial w^j}, \qquad (5)$$

where the partial derivatives $$\frac{\partial f_k(x, w)}{\partial w^i} \text{ and } \frac{\partial f_k(x, w)}{\partial w^j}$$

measure change in functional output of a network given a change in weight. The Additional Details section below describe extension of the metric formulation to cases where a set is considered, X, of training data and view g as the average of metrics derived from individual training examples. The metric, g, provides a local measure of functional distance on the pseudo-Riemmanian manifold (W, g). At each point in weight space, the metric defines the length, $\langle du, du \rangle_w$, of a local perturbation by its impact on the functional output of the network (FIG. 1B).

Globally, the metric can be used to determine the functional performance change across a path connected set of networks. Mathematically, the metric changes as one moves in W due to the curvature of the ambient space that reflects changes in the vulnerability of a network to weight perturbation (FIG. 1C). As a network moves along a path, $\gamma(t) \in$ W from a given trained network $\gamma(0)=w_t$ to a damaged network $\gamma(1)=w_d$, the integrated impact of damage on network performance can be analyzed along $\gamma(t)$ by using the metric to calculate the length of the path $\gamma(t)$ as:

$$L(\gamma) = \int_0^1 \left\langle \frac{d\gamma(t)}{dt}, \frac{d\gamma(t)}{dt} \right\rangle_{\gamma(t)} dt, \quad (6)$$

where $$\left\langle \frac{d\gamma(t)}{dt}, \frac{d\gamma(t)}{dt} \right\rangle_{\gamma(t)} = \frac{d\gamma(t)}{dt} g_{\gamma(t)} \frac{d\gamma(t)}{dt}$$

is the infinitesimal functional change accrued while traversing path $\gamma(t) \in$ W.

In what follows, the resilience of neural networks was studied by analyzing the structure of the metric tensor along paths in weight space. The metric tensor can be used to develop recovery methods by finding 'geodesic paths', minimum length paths, in the pseudo-Riemannian manifold that allow networks to respond to damage while suffering minimal performance degradation.

The Geometry of Local Damage and Network Vulnerability

In some embodiments, the mathematical framework can be first applied to analyze the response of trained neural networks to small, local weight perturbations. Trained networks are often robust to small, local weight perturbation. Local resilience can be connected to the spectral properties of the metric tensor, g, at a given position, $w_t$, in weight space. As described herein, networks are typically robust to random local weight perturbations but also have catastrophic vulnerabilities to specific low magnitude weight perturbations that dramatically alter network performance.

To understand local damage, a trained network is considered, $w_t$, and the network is subjected to an infinitesimal weight perturbations in a direction $du=c_i dw^i$ yielding the perturbed weights $w'=w_t+du$. $dw^i$ is used to indicate an infinitesimal displacement vector in the direction $w_i$. Formally, du is viewed as a vector in the tangent space of W at $w_t$, $T_{w_t}(W)$ (FIG. 1B). The metric tensor evaluated at the point $w_t$ provides a local measure of functional performance change induced by the perturbation along du through Equation 8.

As a positive semi-definite, symmetric matrix, g (evaluated at $w_t$) has an orthonormal eigenbasis $\{v_i\}$ with eigenvalues $\lambda_i$, $\lambda_j \geq 0$. The eigenvalue $\lambda$ locally determines how a perturbation along the eigenvector $v_i$ will alter functional performance. Expanding an arbitrary perturbation, du in the basis $\{v_1\}$, as $du=\Sigma_i c_i v_i$, the functional performance change of the network is $$d(w_t, w_t + du) = du^T g_{w_t} du \quad (7)$$

$$= \sum_i c_i^2 \lambda_i \quad (8)$$

where $c_i = \langle du, v_i \rangle$ quantifies the contribution of vector $v_i$ to du. Thus, the performance change, $d(w_t, w_t+du)$, incurred by a network, following perturbation du is determined by the magnitude of each $\lambda_i$ and the projection of du onto $v_i$. The eigenvalues $\lambda$ convert weight changes into change in functional performance and so have units of $$\frac{\text{performance change}}{\text{weight change}}.$$

A network will be resilient to weight perturbations directed along eigenvectors, $v_i$, with small eigenvalues ($\lambda_i < 10^{-3}$). Alternately, networks are vulnerable to perturbations along directions with larger eigenvalues ($\lambda_i > 10^{-3}$). The definition of resilient directions, $\lambda_i < 10^{-3}$, is an operational direction that selects directions where a unit of weight change will produce a performance change of less than $10^{-3}$ or 0.1%.

Mathematically, the resilience of networks can be understood to randomly distributed weight perturbations by calculating the average response of a network to Gaussian weight perturbations, $du \sim P(du)$, where $P(du_i)=\mathcal{N}(0, \sigma/d)$ (n=dim(W) and $\mathbb{E}[\|du\|_2]=\sigma$). The expectation of the induced performance change for such a Gaussian perturbation is $$\mathbb{E}_{du_i \sim \mathcal{N}(0, \sigma/d)}[d(w, w + du)] = \frac{\sigma}{d} \sum_i \frac{\lambda_i}{z} \quad (9)$$

$$< \sigma \rho \lambda_1, \quad (10)$$

where $\rho$ indicates the fraction of vulnerable directions, and $\lambda_1$ is the largest eigenvalue of g.

Empirically, trained networks were found to be, perhaps as expected, robust to 'random' local perturbation (FIG. 2A-FIG. 2E) due to a large fraction of resilient eigendirections ($\rho < 10^{-3}$). Such local network robustness holds for a series of trained network architectures including (i) Multilayer perceptrons (MLP-1, MLP-2) trained on MNIST and (ii) Convolutional neural networks (VGG-11) trained on CIFAR-10. MLP-1 is a single hidden layer network, with variable number of hidden nodes, while MLP-2 is the LeNet architecture from LeCun et al. "Gradient-Based Learning Applied to Document Recognition." *Proceedings of the IEEE*, 1998, 86 (11): 2278-2324. (2 hidden layers, with 300 and 100 hidden nodes respectively). VGG-11 for CIFAR-10 was adapted from Simonyan and Zisserman 2014 "Very Deep Convolutional Networks for Large-Scale Image Recognition." *International Conference on Learning Representations*, 2015 (The network architecture, pre-trained models and optimization algorithms are specified in the Additional Details section below).

Figure 2A:
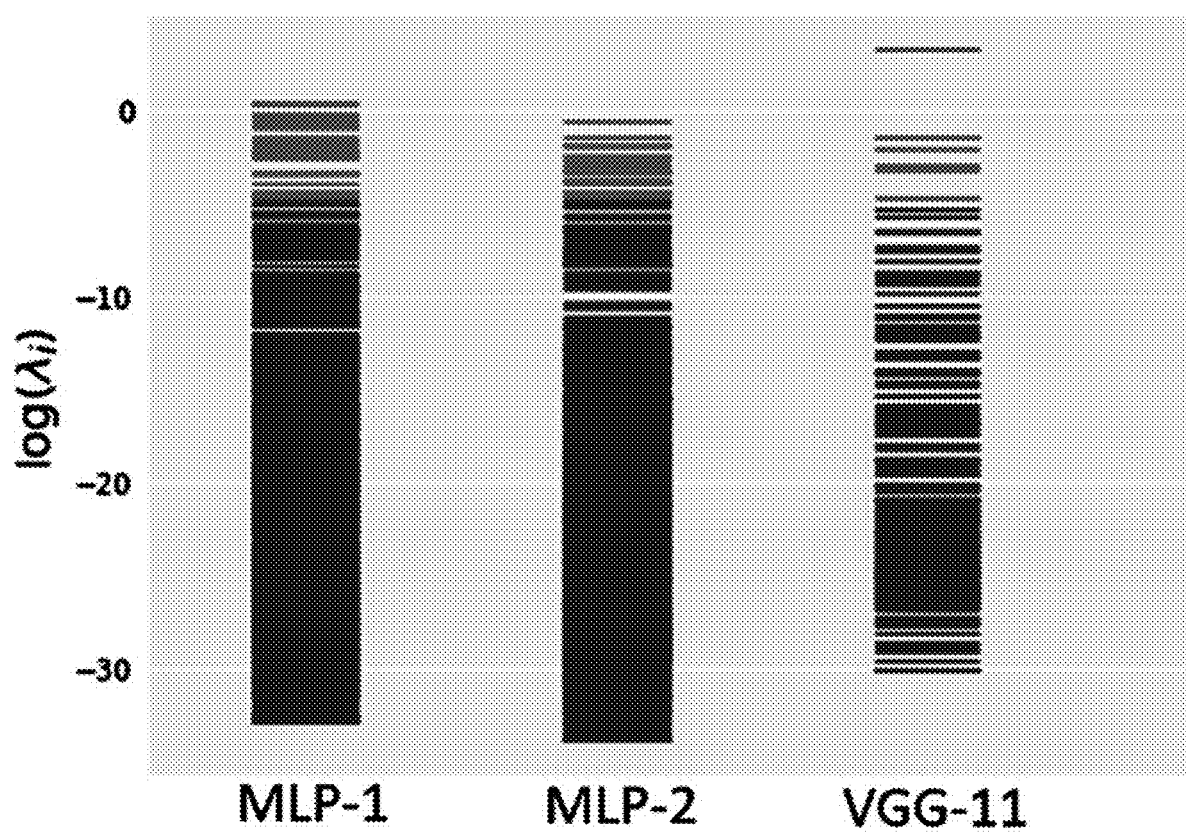
FIG. 2A-FIG. 2E shows metric tensor explains local resilience and predicts catastrophic vulnerabilities.
Figure 2B:
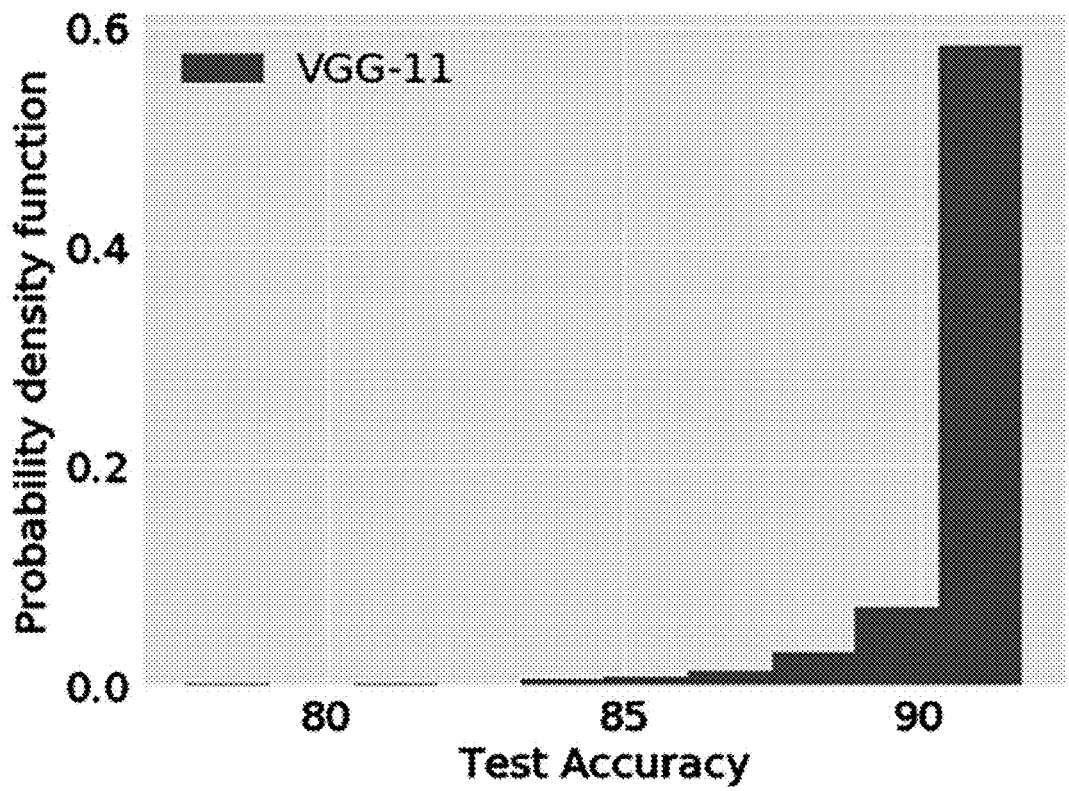
Figure 2C:
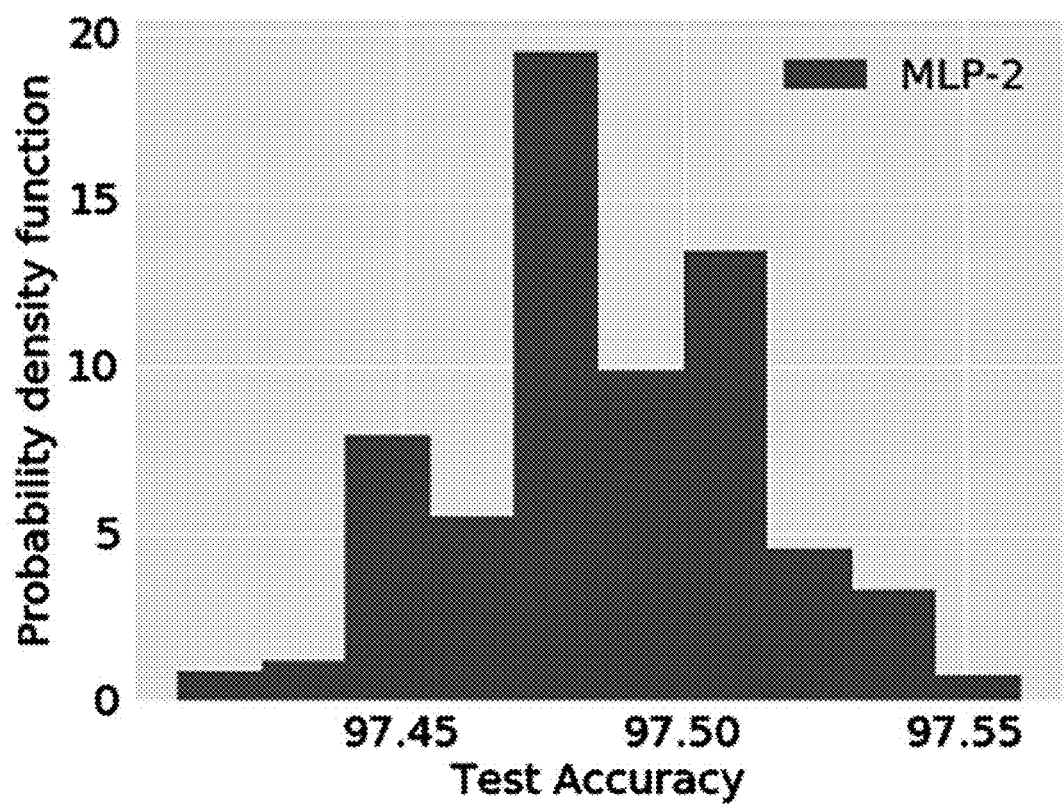
Figure 2D:
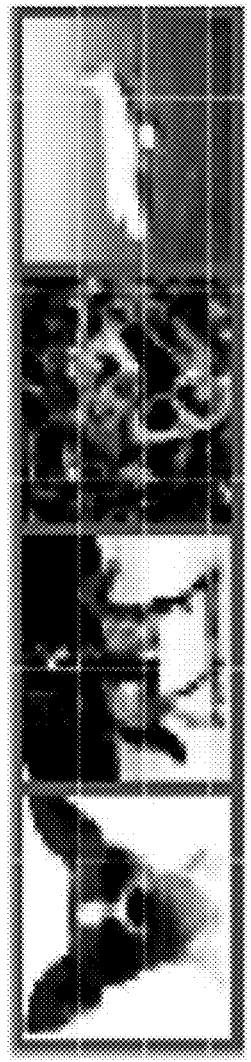
Figure 2E:
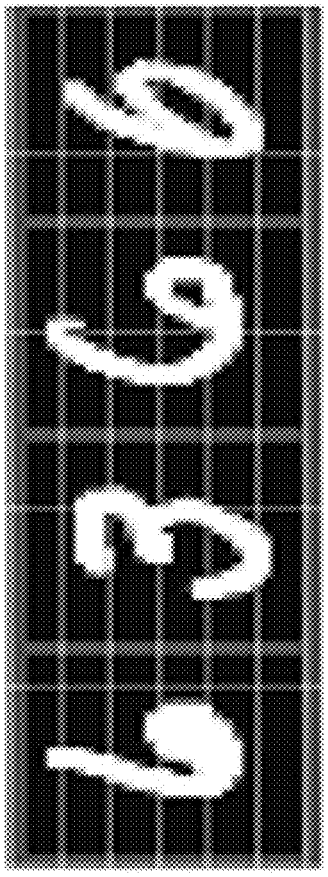

FIG. 2A-FIG. 2E shows metric tensor explains local resilience and predicts catastrophic vulnerabilities. FIG. 2A shows spectra of the metric tensor for MLP-1, MLP-2 and VGG-11. FIG. 2B-FIG. 2C show test performance of networks perturbed within a unit-ball in W (FIG. 2B) perturbed VGG-11 trained on CIFAR-10, (FIG. 2C) perturbed MLP-2 trained on MNIST. FIG. 2D-FIG. 2E show designing adversarial perturbations to destroy trained networks' performance. FIG. 2D shows adversarial perturbation within unit-ball in W lowers accuracy to 13% in VGG-11. FIG. 2E shows adversarial weight perturbation within unit-ball in W lowers accuracy to 70% in MLP-2.

Consistent with their eigenspectra (VGG-11: $\rho<10^{-4}$, MLP-1, MLP-2: $\rho<10^{-3}$), both MLP and CNN architectures exhibit minimal performance degradation for unit-ball perturbations (unit-ball perturbations, due to the high dimensionality of the space, induce an average weight change of $<10^{-6}$ for individual weights) ($\sigma=1$, FIG. 2A). When perturbed along 1000 directions of unit-norm, the trained MLP-2 (initial test accuracy of 98%) maintains accuracy of 97.2-97.6% (FIG. 2C). Perturbation of VGG-11 trained on CIFAR-10 (initial test accuracy of 91%) yields networks with test accuracy between 88-91% (FIG. 2B).

Resilience to such small local perturbations might be expected, but the present framework also exposes hidden catastrophic vulnerabilities to perturbations of the same order in both networks. By designing adversarial weight perturbations to lie along the 'vulnerable' eigenvectors of g ($v_i$ with large $\lambda_i$), sharp performance declines can be induced across architectures (FIG. 2D-FIG. 2E). For the VGG-11 network trained on CIFAR-10, an adversarial weight perturbation decreases accuracy from 91% to 13% (FIG. 2D). Similarly, adversarial perturbation reduces the performance of MLP-2 network trained on MNIST from 98% to 70% (FIG. 2E). For the CIFAR-10 network, a relatively small perturbation causes the network to make critical classification errors making the erroneous inference of most CIFAR-10 images to being in the class of 'automobiles.' In this way, the local geometry of the weight manifold allows subtle weight perturbations to be discovered that cause catastrophic changes in network performance for small change in network weights.

In some embodiments, after a neural network is trained, its resiliency (e.g., the existence and/or the number of adversarial perturbations, the effects of adversarial perturbations) can be determined. If the resiliency of the neural network is not satisfactory, another neural network model can be retrained. The process can be repeated until a neural network with satisfactory resiliency is obtained. In some embodiments, a system or a device (e.g., an edge device, an internet of things (IoT) device, a real-time image analysis system, a real-time sensor analysis system, an autonomous driving system, an autonomous vehicle, a robotic control system, a robot, or a combination thereof) can comprise a neural network with satisfactory resiliency. In some embodiments, a neural network with satisfactory resiliency can be used to perform a task. The task can comprise a computation processing task, an information processing task, a sensory input processing task, a storage task, a retrieval task, a decision task, an image recognition task, and/or a speech recognition task.

Acceleration Identifies Global Break-down Points in a Network

Trained MLP's and CNN's can be surprisingly robust to much more profound global damage including large scale node deletion. In this section, a concept of break-down acceleration is developed using the covariant derivative of a network along paths connecting the trained network and damaged network in W. Break-down acceleration predicts failure points that emerge in weight space through rapid changes in the curvature of the weight space, and ultimately allows methods to be developed and described herein to thwart break-down by avoiding acceleration.

Figure 3A:
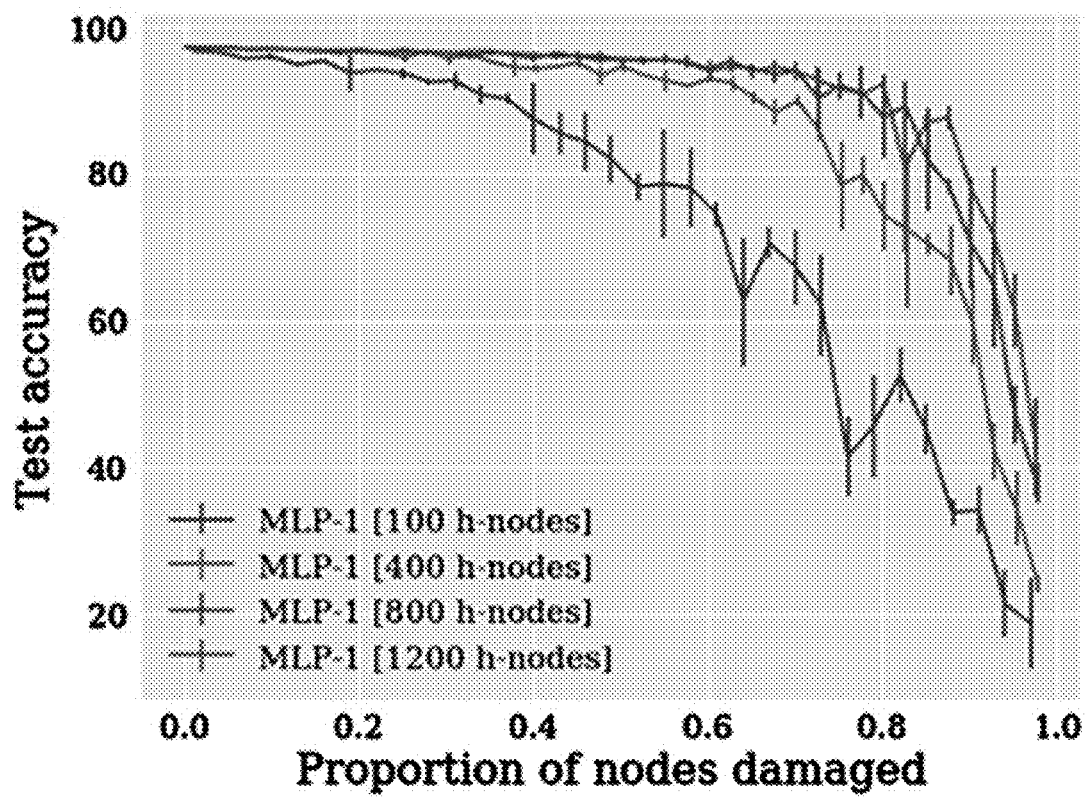
FIG. 3A-FIG. 3F show break-down acceleration characterizes network break-down points following damage. Performance of an (FIG. 3A) MLP-1 network (1 hidden-layer, variable hidden nodes) and (FIG. 3B) VGG-11 during simulated damage to distinct layers. Both networks experience sharp performance break down when network damage exceeds (FIG. 3A) ~90% of hidden-nodes for MLP-1 and (FIG. 3B) ~60% of nodes in any layer for VGG-11.
Figure 3B:
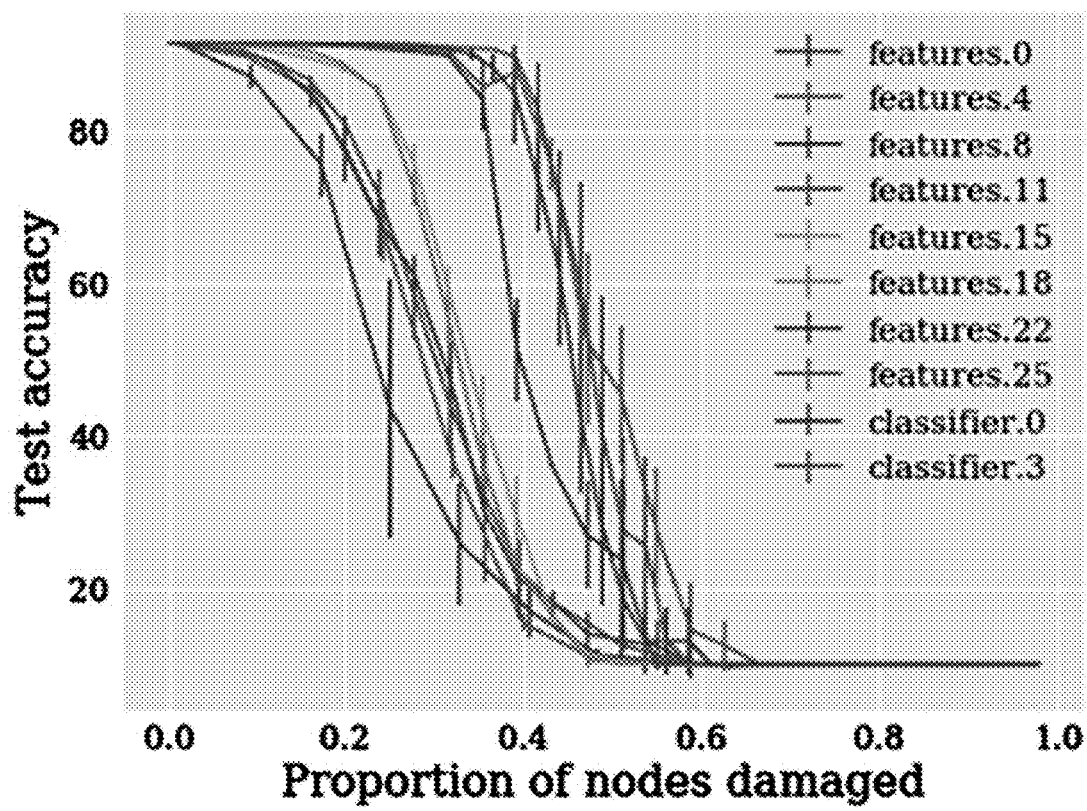
Figure 3C:
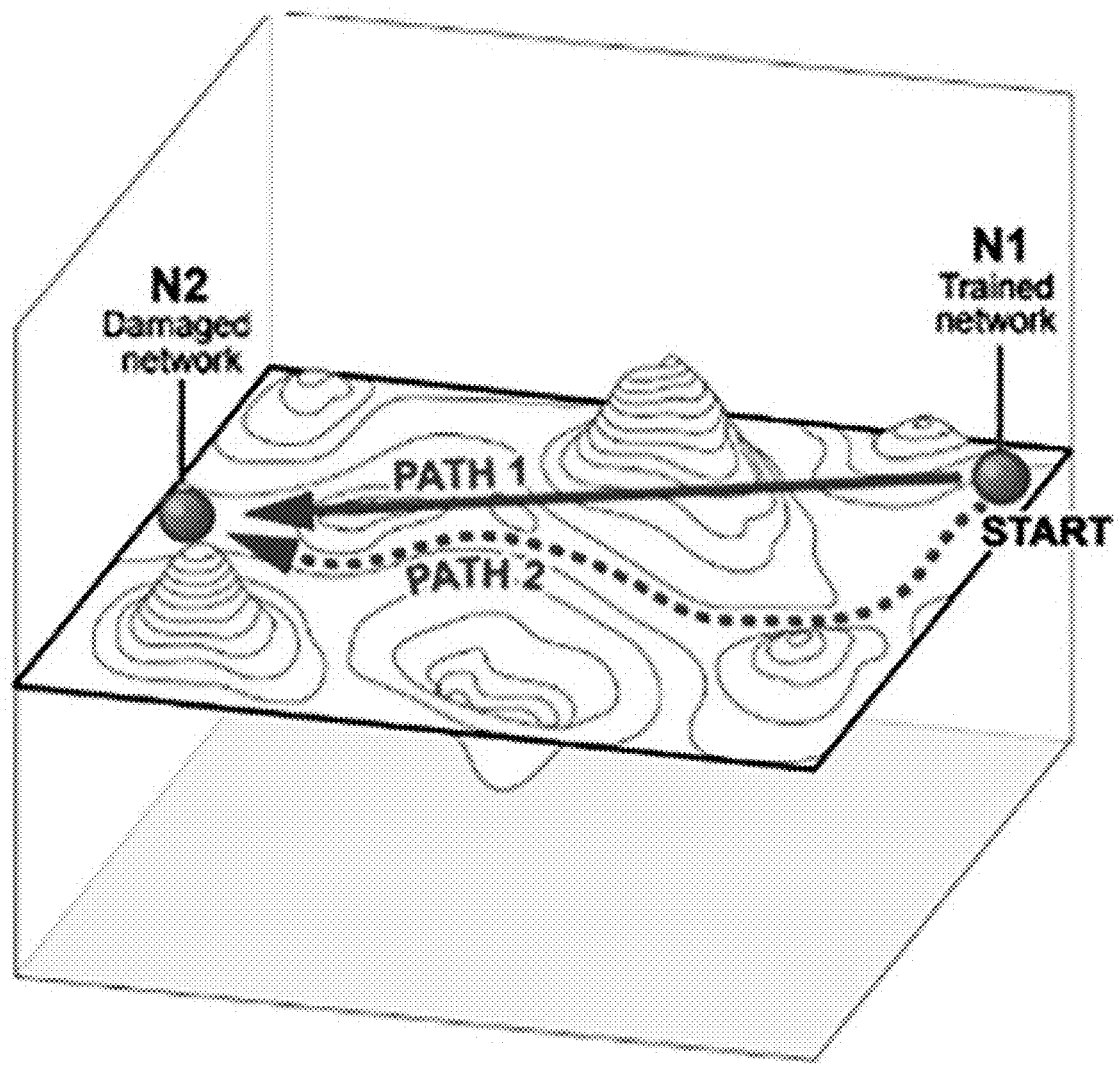

Mathematically, global damage can be represented as a path in weight space, $\gamma(t) \in W$ with $t \in [0,1]$, that connects a trained network, $\gamma(0)=w_t$, to its damaged counterpart $\gamma(1)=w_d$ (FIG. 3C). Practically, global damage might emerge as a discrete event (node deletion), the analysis of the present disclosure provides a continuous approximation to discrete network damage. As a network moves along a path from $w_t$ to $w_d$, the metric tensor itself changes, changing its spectra and its vulnerability.

Along a path, $\gamma(t) \in W$ the velocity vector, $$v(t) = \frac{d\gamma}{dt},$$

quantities the change in the functional performance of a network per unit time. Mathematically, the break-down speed (s) of a network along a path in weight space is defined as the norm of the network's velocity vector computed using the metric tensor $$s(t) = \left\langle \frac{d\gamma}{dt}, \frac{d\gamma}{dt} \right\rangle_{\gamma(t)} = \sum_{ij} g_{ij} w_{ti} w_{tj}.$$

Non-linear break-down points emerge along paths in W when break-down speed undergoes a rapid acceleration, so that $$\frac{ds}{dt} \gg 0.$$

The break-down speed and acceleration can be calculated explicitly for a network following simple straight or Euclidean path from a trained to damaged configuration.

Taking $w_d=0$, $\gamma(t)=w_t(1-t)$ and $$\frac{ds}{dt} = \sum_{i,j} \sum_k \frac{dg_{ij}}{dw_k} w_{tk} w_{ti} w_{tj} \qquad (11)$$

this gives $$\frac{d\gamma(t)}{dt} = -w_t,$$

where $g_{ij}$ is evaluated along $\gamma(t)$. The change in the metric tensor $$\frac{dg_{ij}}{dw_k}$$

along a path $\gamma(t)$, thus, determines whether performance decays at a constant $$\frac{ds}{dt} = 0, \frac{dg_{ij}}{dk} = 0$$

or at an accelerating $$\frac{ds}{dt} > 0, \frac{dg_{ij}}{dw_k} > 0 \text{ rate.}$$

For curved paths break-down acceleration can be analyzed using an object known as the covariant derivative, $\nabla_{\dot{v}(t)} v(t)$ (see the Additional Details section below).

Figure 3D:
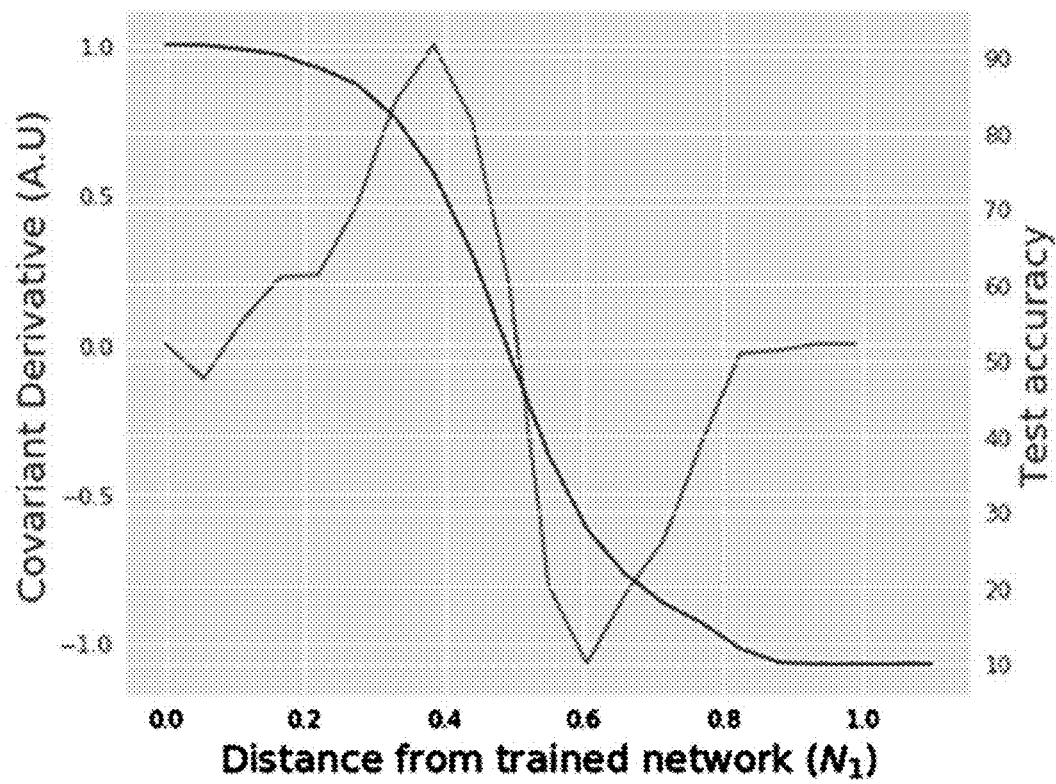
Figure 3E:
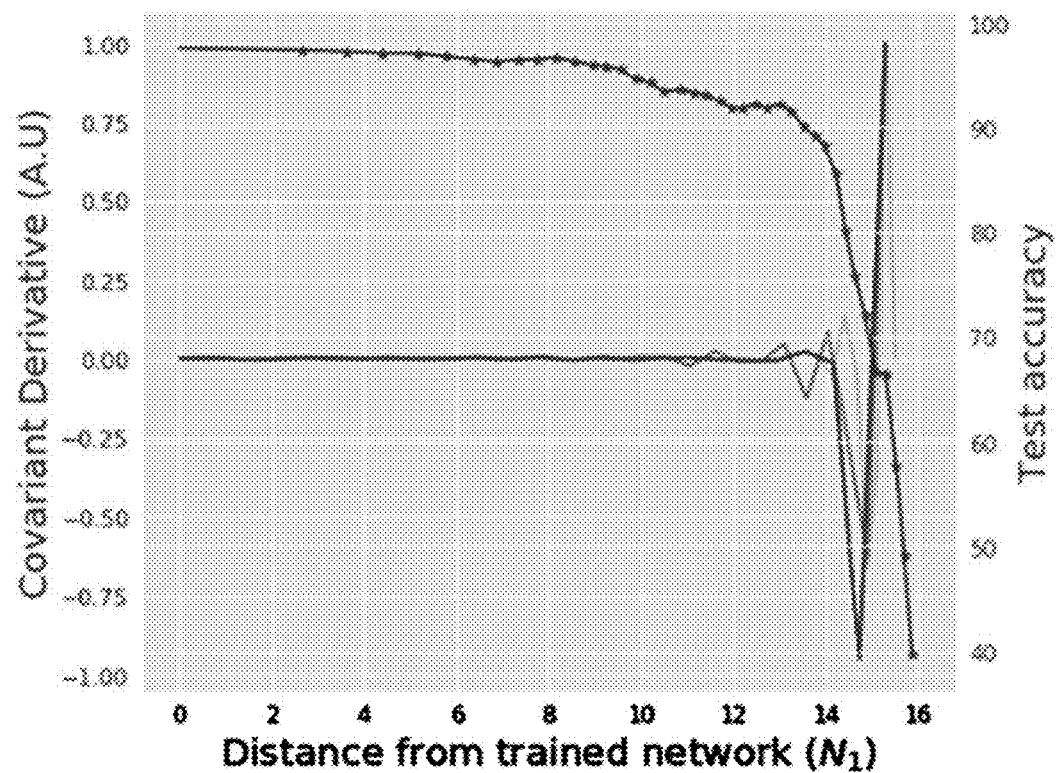
Figure 3F:
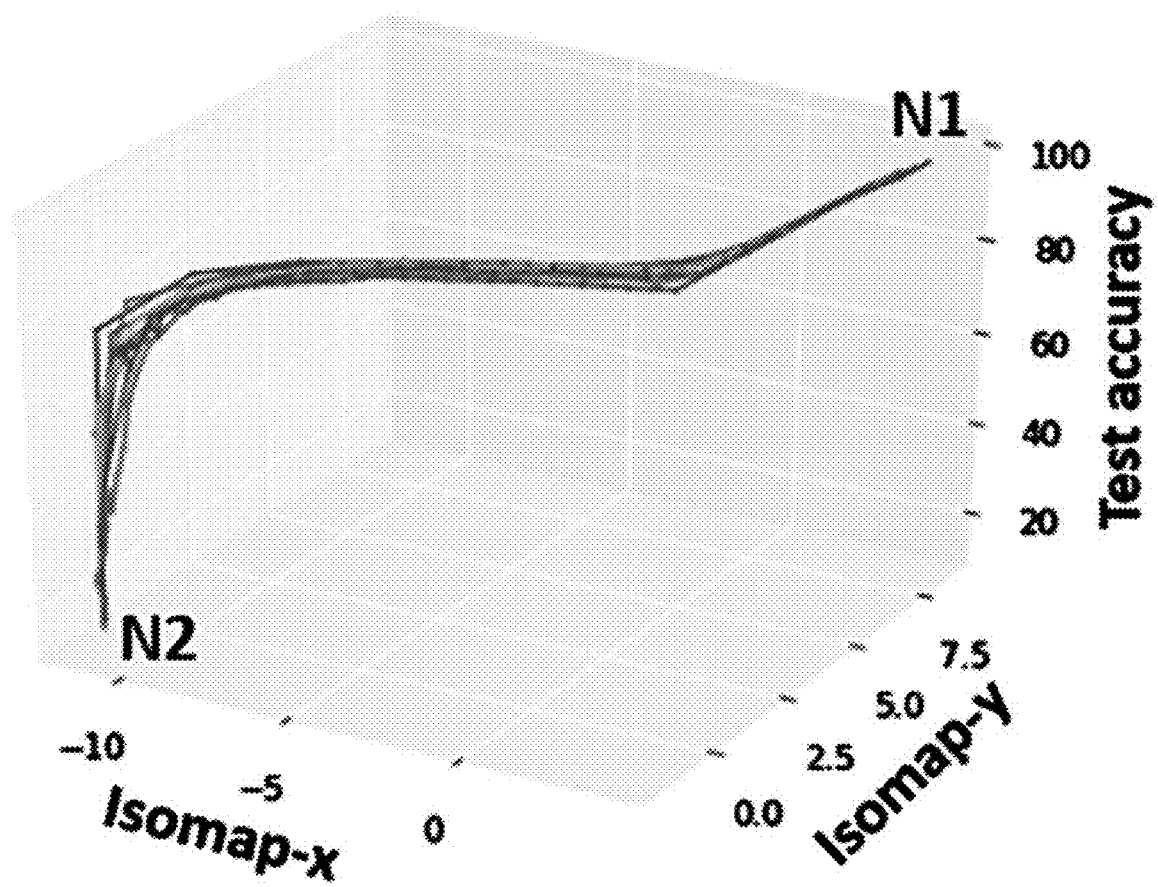

In practice, calculation of the break-down acceleration identifies, damage failure points in real neural networks. For example, both MLP-1 and VGG-11 architectures tolerate considerable node deletion (FIG. 3A). MLP-1, (one hidden layer, 400 hidden units) trained on MNIST, tolerates damage to 80% of the network nodes reducing functional performance of the network by merely ~10%. Similarly, VGG-11 trained on CIFAR-10 tolerates 60% node damage in any layer without performance degradation. However, both networks exhibit drastic break-down in functional performance beyond these node damage thresholds (FIG. 3A-FIG. 3B). Mathematically, break-down points occur where the acceleration of the network, as measured by the covariant derivative along the damage path, rapidly increases (FIG. 3D-FIG. 3F). Steep increases in the covariant derivative identify points of loss acceleration corresponding to the functional breakdown of both the networks analyzed.

FIG. 3A-FIG. 3F show break-down acceleration characterizes network break-down points following damage. Performance of an (FIG. 3A) MLP-1 network (1 hidden-layer, variable hidden nodes) and (FIG. 3B) VGG-11 during simulated damage to distinct layers. Both networks experience sharp performance break down when network damage exceeds (FIG. 3A) ~90% of hidden-nodes for MLP-1 and (FIG. 3B) ~60% of nodes in any layer for VGG-11. FIG. 3C-FIG. 3E show damage paths in manifold (W, g). FIG. 3C is a cartoon of the loss landscape showing multiple break-down paths from the trained network to the damaged network. FIG. 3D-FIG. 3E show the covariant derivative of the accuracy along multiple damage paths for (FIG. 3D) MLP-2 and (FIG. 3E) VGG-11 are shown. A steep increase in the covariant derivative (acceleration) along damage paths corresponds to the networks' sharp break-down to global damage. FIG. 3F shows multiple damage paths (colored lines) shown from trained MLP-2 (N1) to its damaged counter-part (N2). The z-axes is the test-accuracy of the networks, while x,y axes are the isomap embedding of networks in a 2D space.

Geodesic Paths Enable Network Recovery

Thus, globally, network break-down occurs along a damage path in W due to abrupt changes in the curvature of the underlying functional landscape that result in abrupt change in the metric. Disclosed herein is a method for designing recovery protocols that can adapt a neural network's weights to compensate for damage based on the mathematical connection between break-down and curvature. Recovery mechanisms exist in neuroscience that compensate for damage by altering the weights of undamaged nodes. The concept of break-down acceleration can be applied to develop recovery methods for artificial neural networks that compensate for damage through continuous adjustment of the undamaged weights by minimizing the acceleration along the path.

Mathematically, minimum acceleration paths in weight space are known as geodesic paths. Geodesic paths, by definition, provide both minimum length and minimum acceleration paths in weight space. Specifically, a trained network is considered, w, subjected to weight damage that zeros a subset of weights, $w_i=0$, for $i \in n_{damaged}$. The method responds to damage by adjusting undamaged weights, $w_i$ for $i \notin n_{damaged}$ to maximize network performance by moving the network along a geodesic in W. Geodesic paths can be computed directly using the metric g and also represent the minimum distance paths (with distance defined in Equation 6) between two points on W. Geodesic paths can be typically calculated using the geodesic equation (see the Additional Details section below) an ordinary, differential equation that uses derivatives of the metric tensor to identify minimum acceleration paths in a space given an initial velocity. However, solutions to the geodesic equation are computationally prohibitive for large neural networks as they require evaluation of the Christoffel symbols which scale as a third order polynomial of the number of parameters in the neural network ($\mathcal{O}(n^3)$).

Therefore, an approximation to the geodesic equation was developed using a first order expansion of the loss function. Given a trained network, the method updates the weights of the network to optimize performance given a direction of damage. To discover a geodesic path $\gamma(t)$, the method begins at a trained network and iteratively solves for the tangent vector, $\theta(w)$, at every point, $w=\gamma(t)$, along the path, starting from $w_t$ and terminating at the damage hyperplane, $W_d$. The damage hyperplane is the set of all networks, $w \in W$, such that $w_i=0$, for $i \in n_{damaged}$. Specifically, the following is solved $$argmin_{\theta(w)} \langle \theta(w), \theta(w) \rangle_w - \beta \theta(w)^T v_w \text{ subject to:}$$
$$\theta(w)^T \theta(w) \leq 0.01. \quad (12)$$

The tangent vector $\theta(w)$ is obtained by simultaneously optimizing two objective functions: (1) minimizing the increase in functional distance along the path measured by the metric tensor ($g_w$) [min: $(\langle \theta(w), \theta(w) \rangle_w = \theta(w)^T g_w \theta(w))$] and (2) maximizing the dot-product between the tangent vector and $v_w$, vector pointing in the direction of the hyperplane [max: $(\theta(w)^T v_w)$] to enable movement towards the damage hyperplane. By finding geodesic paths to the damage hyperplane, the method can find weight adjustments that can be made within a network during damage to maintain performance (FIG. 4E).

The optimization method can be described as a quadratic program that trades off, through the hyper-parameter $\beta$, motion towards the damage hyper-plane and the maximization of the functional performance of the intermediate networks along the path (the optimization method elaborated in the Additional Details section below). The method discovers multiple paths from the trained network $w_t$ to $W_d$, damage hyper-plane, (depicted as path-1 to path-4 in FIG. 4E) where networks maintain high functional performance during damage. Of the many paths obtained, the path with the shortest total length (with respect to the metric g) can be selected as the best approximation to the geodesic in the manifold.

The geodesic method enables damage compensation through continuously updating weights in the network. The geodesic method can be applied to discover recovery paths from a trained network (VGG-11) to a pre-defined damage hyperplane (FIG. 4A-FIG. 4B: Damage hyperplane for VGG-11 is defined by deletion of 30 conv-filters from layer1,2 and 1000 nodes from fully-connected layer1,2.). The recovery path is a high-performance path with all networks performing above 87% test accuracy, and the recovery path maintains low break-down acceleration when compared to the naive (linear) path (FIG. 4B). A similar analysis for MLP's is presented in the Additional Details section below.

While high-performance paths can also be discovered through heuristic fine-tuning, the geodesic method is both rational and computationally efficient. Specifically, an iterative prune-train cycle achieved through structured pruning of a single node at a time, coupled with stochastic gradient descent (SGD) retraining (FIG. 4C) requires 70 training epochs to identify a recovery path. In comparison, the geodesic method finds paths that quantitatively out-perform the iterative prune-train method and obtains these paths with only 10 training epochs (FIG. 4C-FIG. 4D).

Figure 4A:
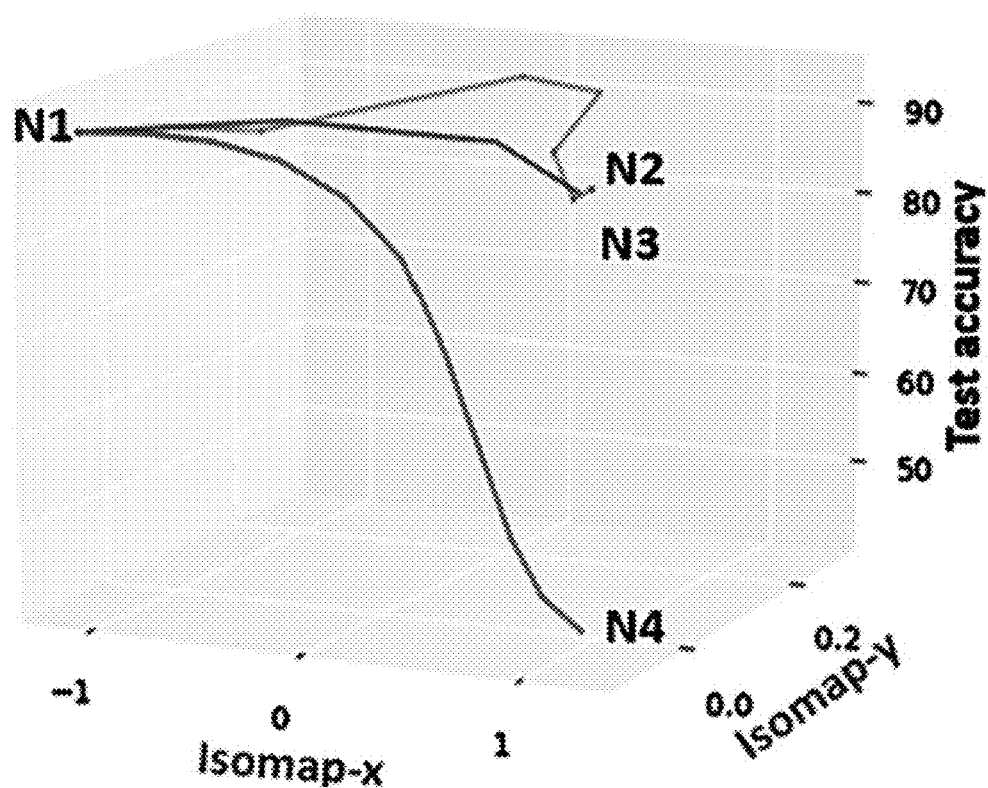
FIG. 4A-FIG. 4F shows geodesic paths allow damage compensation through weight adjustment.
Figure 4B:
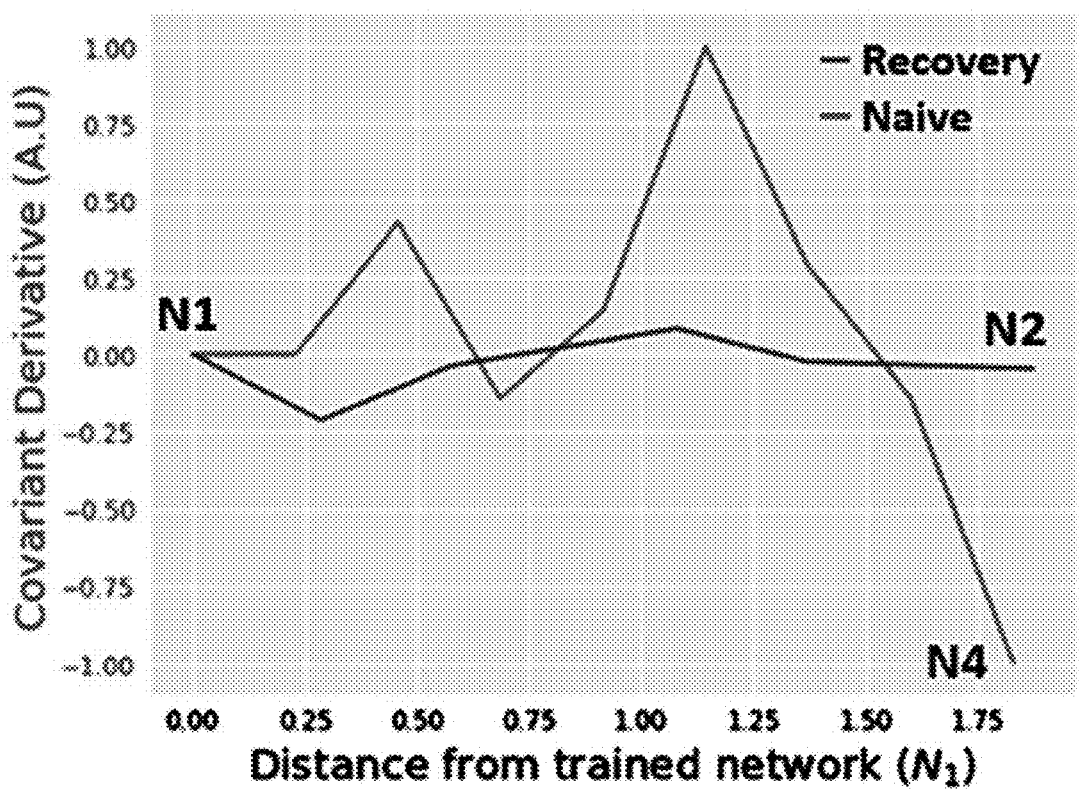
Figure 4C:
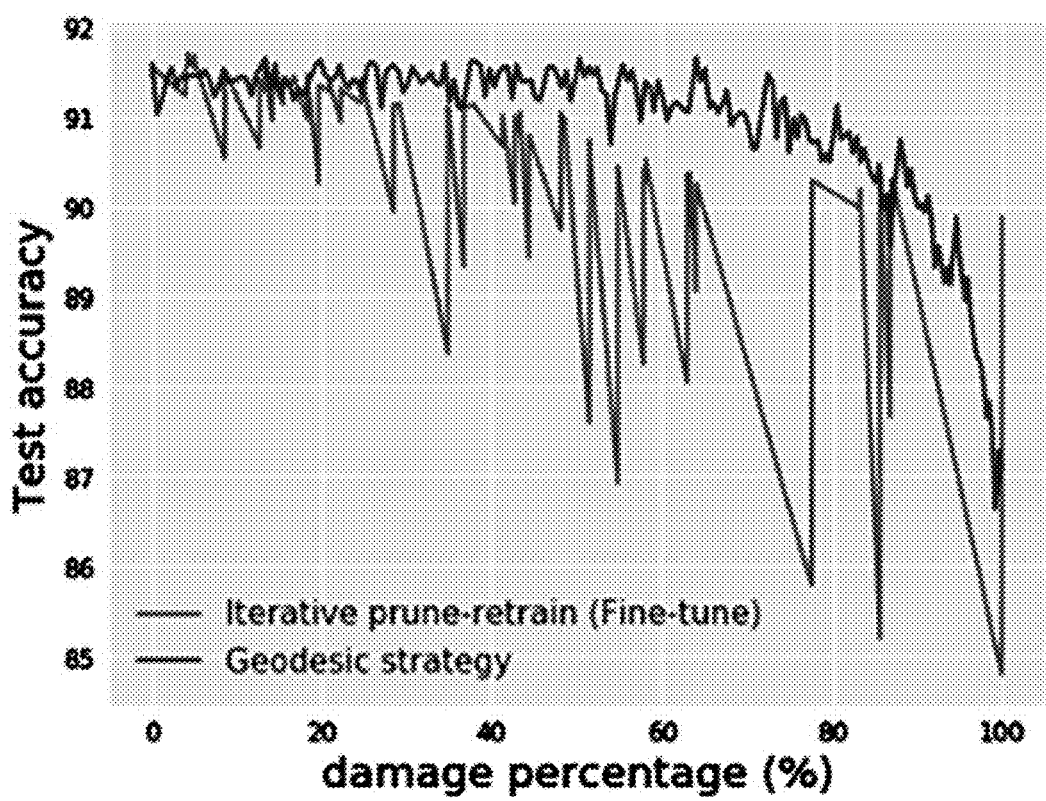
Figure 4D:
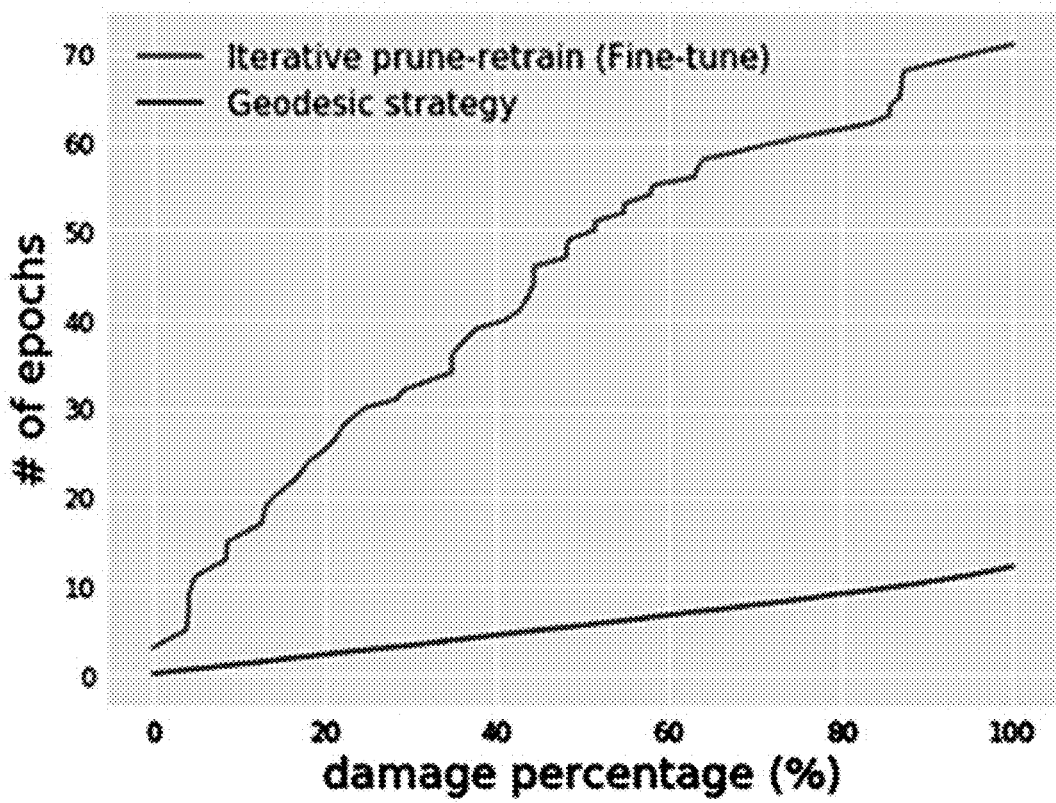
Figure 4E:
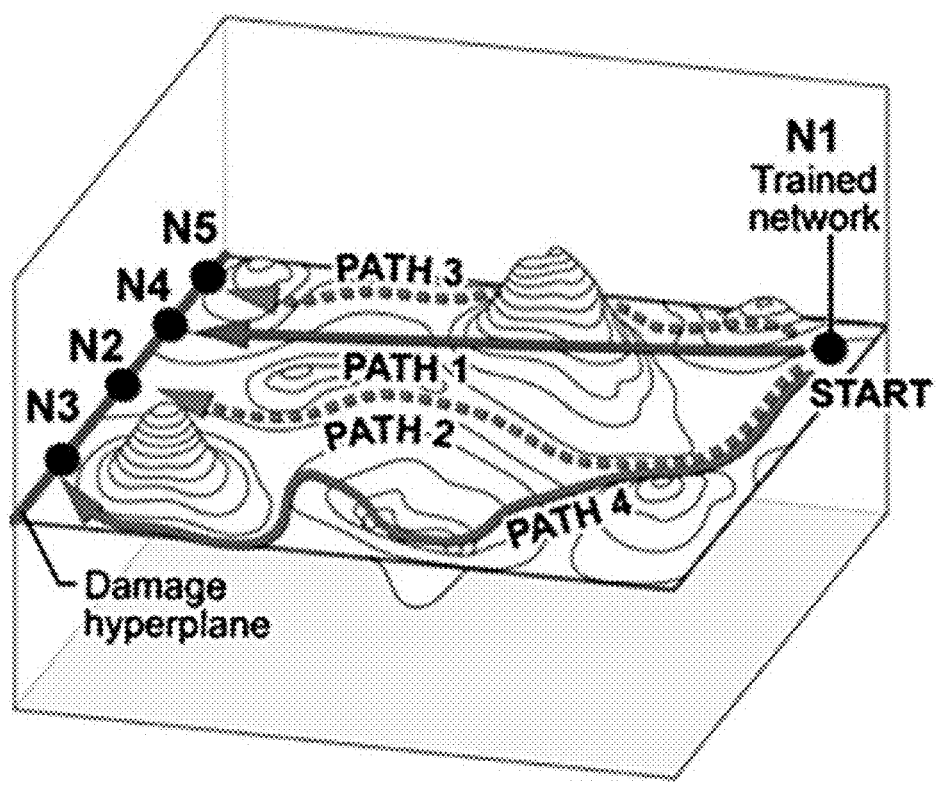
Figure 4F:
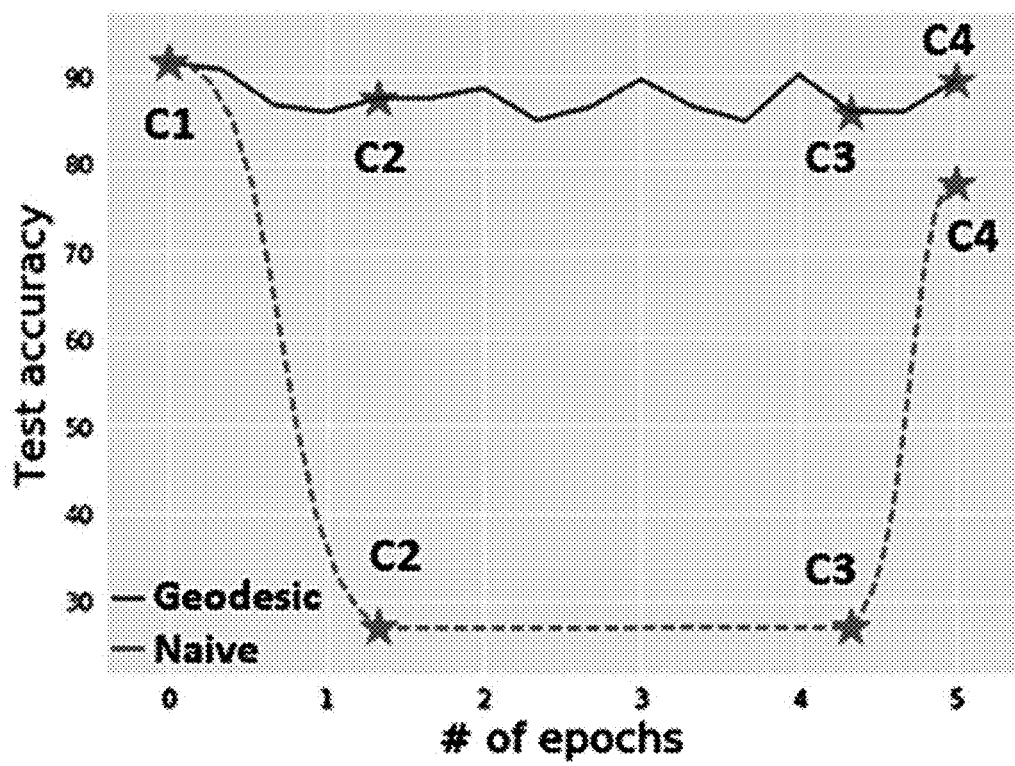

Additionally, the same geodesic method enables one to dynamically shift networks between different weight configurations (e.g., from a dense to sparse or vice-versa) while maintaining performance (FIG. 4F). In some embodiments, the rapid shifting of networks can be relevant for networks on neuromorphic hardware to ensure that the real-time functionality of the hardware isn't compromised while transitioning between different power configurations.

FIG. 4A-FIG. 4F shows geodesic paths allow damage compensation through weight adjustment: FIG. 4A shows test accuracy of geodesic recovery paths (blue) versus naive damage paths (red) for VGG-1 network while 30 convolution filters and 1000 nodes from fully-connected layers are damaged. While the naive path exhibits sharp break-down, the geodesic method adjusts undamaged weights to maintain test accuracy. FIG. 4B shows magnitude of the covariant derivative (break-down acceleration) for geodesic (blue) and naive damage paths (red). FIG. 4C-FIG. 4D show test accuracy (FIG. 4C) and number of network update epochs (FIG. 4D) for geodesic recovery (blue) vs fine-tuning (green) while 50 (out of 60) conv-filters are deleted from layer1 in VGG-11. Geodesic recovery requires ≤10 total update epochs. FIG. 4E depicts multiple recovery paths on the loss landscape from trained network (N1) to networks on the damage hyper-plane (N2, N3, N4, N5). The z-axes is network-loss, while the x,y axes are neural net weights. FIG. 4F. The geodesic method (blue) allows networks to dynamically transition between configurations: C1, trained VGG-11 network ; C2, 50 conv-filters removed from C1; C3, 1000 additional nodes removed from classifier-layers in C2; C4, 30 conv-filters in conv-layer1 restored to C3. Dynamic transitioning enabled within 5 epochs. The naive method is shown in red).

Dynamic Damage Compensation

Figure 5B:
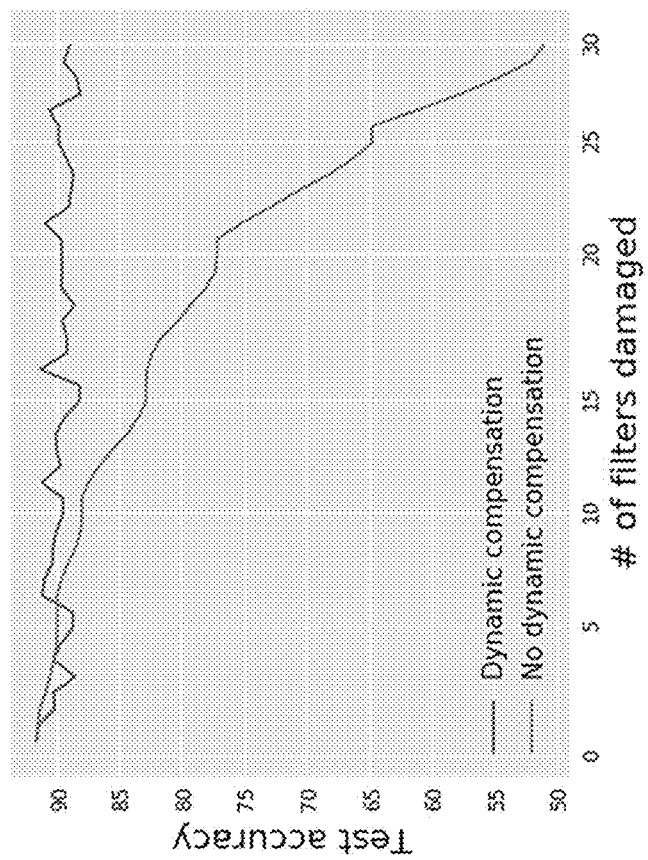
FIG. 5A-FIG. 5B show dynamic damage and compensation in (FIG. 5A) MLP-2 incurring a damage of 50 nodes per-unit time and (FIG. 5B) VGG-11 incurring a damage of 5 filters per-unit time.
Figure 5A:
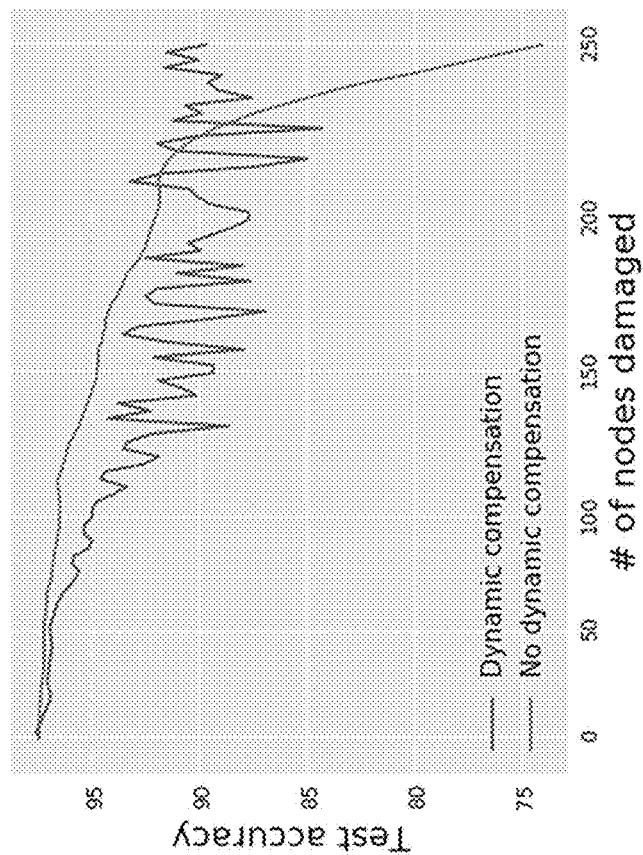

Neural networks incorporated in IoT devices or networks used for critical applications need to maintain a very high functional performance always (during the lifetime of the device). That is, it is desirable that these networks to be robust to local and global damage (perturbation). This section shows that by endowing networks with the ability to self-recover rapidly (within a single epoch, at times), networks that constantly compensate for vulnerabilities and damage can endure a lot more damage than those that are not equipped with recovery procedures. In FIG. 5A-FIG. 5B, a small set of nodes were damaged at every time-point from the network and track the functional performance of the network for two scenarios: (i) with dynamic self-recovery of the network (blue line) and (ii) No recovery protocol (green line). It was observed that endowing self-recovery procedures for large networks (like VGG-11) are extremely useful (FIG. 5A). As shown in FIG. 5B, VGG-11 networks without dynamic compensation quickly degrade their functional performance to 50% when 30 filters (5 filters damaged per time-point), while networks with a recovery procedure are maintain their high functional performance at ~88% after the damage of 30 filters. FIG. 5A-FIG. 5B show dynamic damage and compensation in (FIG. 5A) MLP-2 incurring a damage of 50 nodes per-unit time and (FIG. 5B) VGG-11 incurring a damage of 5 filters per-unit time.

Discussion

A mathematical framework has been established to analyze resilience of neural networks through the lens of differential geometry. Disclosed herein include A functional distance metric on a Riemannian weight manifold is disclosed herein. The metric tensor, covariant derivative, and the geodesic can be applied to predict the response of networks to local and global damage. Mathematically, the present disclosure forms new connections between machine learning and differential geometry. The new methods described herein can be used for (i) identifying vulnerabilities in neural networks and (ii) compensating for network damage in real-time through computationally efficient weight updates, enabling their rapid recovery. In some embodiments, these methods could be useful in a variety of practical applications as neural networks are increasingly deployed on edge devices with increased susceptibility to damage.

Broader Impact

The field of artificial intelligence (AI) has grown by leaps and bounds in the last few years. As a result, AI is increasingly being built into many critical applications across the society. Additionally, to cater to the rising need of AI systems for real-time applications, AI systems have been transitioning from cloud-implementation to edge devices and neuromorphic hardware. Some of the real-time critical applications that have actively adopted AI systems include (1) decision making in the health-care industry, (2) real-time image and sensor analysis in self-driving cars, (3) incorporation into IoT sensors and devices installed in most households and (4) robotic control systems.

The failure of AI in any of these applications could be catastrophic. For instance, errors committed by AI systems while classifying radiology reports in the health-care industry, or the faulty real-time analysis of stream of images being processed by AI systems in self-driving cars could lead to human casualties. Hence, it has become extremely important to understand how neural network architectures (performing critical applications) react to perturbations, that could arise from many sources. AI implemented on the cloud are a victim of DRAM (dynamic random-access memory) errors that can occur at surprising rates, either due to malicious attack or induced by high energy particles. Additionally, the growing implementation of AI networks on physical hardware (for instance, neuromorphic, edge devices) has made the need for discovering damage-resilient networks and rapidly recovery damaged networks a necessity.

The present disclosure lays down the mathematical framework to study resilience and robustness of neural networks to damage and proposes algorithms to rapidly recover networks experiencing damage. In some embodiments, the methods and frameworks described herein can be extremely important for AI systems implemented across many applications, as damage of systems is inevitable and needs to be protected against. Although resilience and robustness of AI systems is very important, there were not many principled studies on the same. To reduce the gap in knowledge on the resilience of AI, a principled framework is disclosed herein to understand the vulnerabilities of AI networks. Exemplary applications include the design of damage-resilient networks and rapid recovery algorithms implemented on neuromorphic hardware. The methods and frameworks of the present disclosure can be important as neural networks are becoming ubiquitous across many applications, ranging from rovers sent to mars to radiology applications.

Additional Details

This section provides more detailed construction of the mathematical framework, the geodesic path optimization method, and information on the neural network architectures used in the numerical experiments performed and described herein. In the first sections the definition of a Riemannian manifold (W, g) and several technical aspects of the metric are described. An issue is the extension of the construction to multiple input data points and the impact of this extension on the metric. Then, the tangent space, formalize the covariant derivative, and geodesic damage compensation algorithm are discussed. In the last section, details are provided about the MLP and CNN neural networks used in numerical experiments.

Constructions of the Riemannian Weight Manifold

Mathematical tools from differential geometry are applied to study the response of neural networks to weight perturbation. The fundamental construction is that a weight space, W, is considered to be a smooth manifold endowed with a Riemannian metric, g, so that the pair (W, g) is a Riemannian manifold. Following this construction, the analysis of local and global damage follows by using standard tools from differential geometry including the tangent space, the covariant derivative and the geodesic to analyze damage.

An aspect of this construction is that the user proceeds by considering the weight space itself to be the manifold, and pull-back a functional metric onto W. The construction allows isolating mathematical complexity concerning the definition of the neural network within the construction of the metric itself. Following the construction of the metric, network damage can be analyzed by applying the non-Euclidean metric tensor to calculate distances within W, where W is homeomorphic to standard Euclidean space. In what follows the construction of the Riemannian manifold and how the mathematical properties of g as a positive (semi)-definite bilinear form arise are discussed.

A Riemannian manifold consists of a smooth topological manifold endowed with a Riemannian metric. A smooth topological manifold, M, is a locally Euclidean space. By locally Euclidean, it is meant that around every point, $p \in M$ there is a function, $\phi$), that maps a neighborhood of M, U where $p \in U \subset M$, to $\mathbb{R}^n$ ($\phi: U \to \mathbb{R}^n$) so that the collection $\{(U_\alpha, \phi_\alpha)\}$ known as an atlas, covers M. In the general case, many different open sets $U_\alpha$ to cover M may be needed. The case of weight space is quite convenient in that a single map, the identity map, gives an atlas for W. For a smooth manifold, each a homeomorphism and so be continuous, locally one-to-one and have a continuous inverse. The weight space W is homeomorphic (and diffeomorphic) to $\mathbb{R}^n$ by the identity map, and so therefore W is a smooth manifold. The simplicity of the manifold gives the present methods much of its practical power.

Now, a metric is introduced onto W that endows the manifold with a notion of distance that encapsulates the function properties of the underlying neural network. Intuitively, W can be thought of as becoming a curved space due to the influence of the functional properties of the neural network on the local structure of space. The approach has analogies with physical models where the path of a particle through an ambient space can be influenced by a metric which is the manifestation of a physical force like gravity. Neural networks can be viewed as dynamically moving along a smooth manifold whose notion of distance is functional.

Specifically, a neural network is considered to be a smooth, $C^\infty$ function f(x, w), that maps an input vector, $x \in \mathbb{R}^k$, to an output vector, $f(x, w) = y \in \mathbb{R}^m$. The function, f(x, w), is parameterized by a vector of weights, $w \in \mathbb{R}^n$, that are typically set in training to solve a specific task. In general, several popular neural network functions like the rectified linear unit (ReLU) are not actually $C^\infty$ (do not have continuous derivatives of all orders). For example, the ReLU function h(x)=max(x, 0) has a discontinuity at h'(0). However, the function is commonly approximated by the softplus function h(x)=log(1+exp(x)) which is $C^\infty$, and so there is not an issue.

The training data itself has an interesting and more subtle impact on the metric. To construct a metric on W, first, consider the map generated by the network f given a fixed data point x $$f(x, w): W \to \mathbb{R}^m. \tag{13}$$

This map is called the functional map. A specific example of such a map is that x could be a specific vector of image data from MNIST, and f maps this data to a m=10 dimensional space that scores the image for each of the 10 possible handwritten digits. Globally, it is noted that f in general will not be one-to-one or onto.

Locally, it is asked how the output of f changes for an infinitesimal weight change $$f(x, w+dw) = f(w) + df \tag{14}$$
$$= f(w) + \frac{\partial f_i}{\partial w_j} dw_j,$$

where $dw_1$ is taken to be standard basis vectors in W, and $$J = \frac{\partial f_i}{\partial w_j}$$

is the Jacobian matrix of partial derivatives. In general J will be an n×m matrix and, therefore, rank(J)≤min(n, m), so that the rank of J is determined by the number of weights and the number of output functions. A key difference between the present framework and classical settings in which differential geometry is applied is that, here, n≠m. In fact, it will be a very special case that achieves an equality of weights and output function.

To construct the metric, mean squared error may be used to measure the distance between functional outputs generated by the unperturbed and perturbed networks as $$d(w, w+dw) = |f(x, w) - f(x, w+dw)|^2 = dw^T (J^T J)$$
$$dw = dw^T g \, dw, \tag{15}$$

where the local notion of distance is used to derive a metric, g, that converts local weight perturbations into a distance. J and g are fields that vary across W. The metric can be evaluated at a position location in space or as the method moves along a path through weight space.

Formally, the metric can be thought of as providing an inner product at every location in weight space. For general manifolds, the mathematical construction is to consider a tangent plane or tangent space at each point $p \in W$, and to imagine a plane that locally approximates a curved manifold at each point. In this case, the metric tensor provides a local inner product and hence a local notion of distance.

Therefore, an inner product on the tangent space at any point p ∈ W can be defined as $$\langle u, v \rangle_p = u^T g_p v, \tag{16}$$

where u, v are taken to be vectors in the tangent space, and $g_p$ is used to indicate the metric evaluated at the point p. Formally, tangent vectors can be typically constructed as local differential operators, but can be viewed intuitively as small arrows at p.

A Riemannian metric is an inner product that satisfies a set of conditions. The inner product must be symmetric, bilinear and positive definite. The positive definite condition can be relaxed through construction of a pseudo-metric. The inner product provides the familiar notions of distance that exist in classical Euclidean spaces.

In general, the notion of a metric is separate from its representation as a matrix, but there is a natural map between inner products and matrices that may be exploited. The metric satisfies symmetry and linearity through the definition of the metric as a product of the Jacobian matrix and its transpose. Linearity is a natural consequence of standard matrix operations. In the case of symmetry, $(u, v)_p = u^T J^T J v = (Jv)^T (u^T J^T)^T = v^T J^T J u = (v, u)_p$. Therefore, the metric is, in general, both symmetric and linear in its arguments.

However, the positive definiteness of the metric is determined by the rank of the Jacobian matrix, J. In the typical case n>m, and the rank of the Jacobian matrix will be limited by m. The metric, g when viewed as a local bilinear form or as an n×n matrix will not be full rank and will be a pseudo-metric. The metric can be analyzed by considering its representation as a matrix, and, thus, apply tools from linear algebra. In general a matrix $A \in \mathbb{R}^{n \times n}$ is positive definite if $x^T A x > 0 \forall x \in \mathbb{R}^n$, x≠0 or equivalently eigenvalues of A $\lambda_i > 0$ ∀i. Alternately, a positive semi-definite matrix A has $x^T A x \geq 0$ ∀x ∈ $\mathbb{R}^n$ and A $\lambda_i \geq 0$ ∀i.

Since g is the product $J^T J$, g has $\lambda_i \geq 0$ as can be seen simply by considering the singular value decomposition of J. However, the matrix rank of g at a point on the manifold is similarly bounded by the rank of J, and rank(g)=rank(J). Therefore, g can have k eigenvalues that are identically zero $\lambda_i = 0$ where k=n−rank(J)<n−m, so that, in general, a metric constructed based on a single training example is not positive definite but positive semi-definite. The key results can be applied to both Riemannian manifolds as well as pseudo-Riemannian manifolds. However, the formal derivation of the geodesic equation requires calculation of an inverse $g^{ij}$ of the metric. The geodesic equation is not explicitly used, here, but can be of interest in applying the framework to construct a positive definite metric.

The rank of the metric can be increased by extending construction to multiple data points. A set of data examples, X, can be considered so that $x_i \in X$. For a single example, the neural network function f generates an output f(x,w) ∈ $\mathbb{R}^m$. The output space for a single example is called, $\mathcal{F}_{x_i}$, and the direct sum of the functional spaces generated from a set of training examples is considered $$\mathcal{F} = \bigoplus_{x_i \in X} F_{x_i}. \tag{17}$$

Each $F_{x_i}$ is homeomorphic to $\mathbb{R}^m$ and $\mathcal{F}$ is homeomorphic to a direct sum of p copies of $\mathbb{R}^m$. In this case, dim($\mathcal{F}$)=m×p where p=|X| is the number of data points used in the construction and dim($F_{x_i}$)=m.

The construction generalizes the notion of functional distance, so that now functional distance involves a sum over all $x_i \in X$ as $$d_\mathcal{F}(f(X;w), f(X;w')) = \sum_{i=1}^{p} \sum_{j=1}^{m} |f_j(x_i, w) - f_j(x_i, w')|^2, \tag{18}$$

where the sum is performed over a set of input vectors $x_i \in X$ and over all components j of the output.

The form of the metric tensor also has a natural generalization to the case of multiple input data points, and simply becomes a sum $$g = \sum_{i=1}^{p} g_{x_i}, \tag{19}$$

where each $g_{x_i}$ is the metric tensor generate from a single data point $x_i$. Intuitively, the metric is, therefore, a sum of the metrics generated for each input data point. Even if each metric is a rank-1 matrix, the sum of a set of such rank-1 matrices has increased rank.

Figure 6:
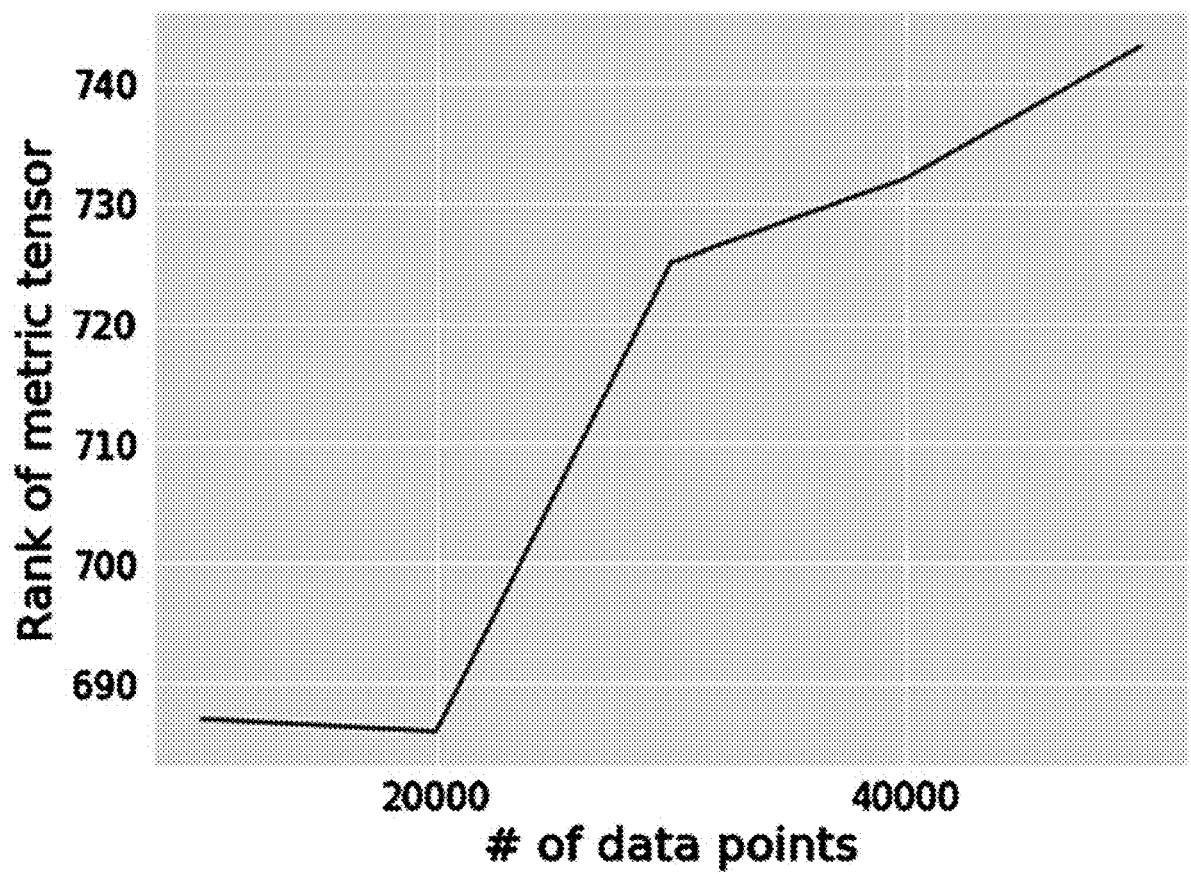
FIG. 6 shows rank of metric tensor increases with the size of the training data set. The rank of the metric tensor, g, for MLP-1 with 10 hidden nodes is plotted using variable sizes of the MNIST training dataset. The rank of the metric tensor increases with data set size.

The result can be important in applications because the rank of g is influenced by both inherent properties of the neural network at a point in weight space and the number of training examples. When n>m×p, the Jacobian matrix is not full rank, and so the rank of the metric is data limited. When m×p>n, the Jacobian matrix can still contain degenerate directions due to the geometry of the function f. In some embodiments, it is the curvature of f that is examined, and so the option of saturating the rank of metric is needed. Numerically, an example is shown in FIG. 6 where the rank of the metric tensor for network MLP-1 trained on MNIST is evaluated. FIG. 6 shows rank of metric tensor increases with the size of the training data set. The rank of the metric tensor, g, for MLP-1 with 10 hidden nodes is plotted using variable sizes of the MNIST training dataset. The rank of the metric tensor increases with data set size.

Local Analysis, Tangent Space and Tangent Vectors

A central insight in differential geometry is that the structure of a manifold can be analyzed by considering the tangent space at each point on the manifold and as well as the properties of the Riemannian metric when restricted to that tangent space. Intuitively, the tangent space is a local linear approximation of a manifold at a single point. The Riemannian metric yields an inner product that allows for calculation of the length of tangent vectors within the tangent plane or space. By calculating inner productions within weight space W the functional response of a network to a local weight perturbation can be determined.

The tangent space of W, $T_W(W)$ at a point, w, can be constructed by considering a set of local tangent vectors at a point. Tangent spaces carry algebraic structures of vector spaces. Tangent vectors can be intuitively viewed as tangent arrows anchored at a specific point on the manifold, but are formally defined as a set of local differential operators. For the weight space W, the set of local operators $$\frac{d}{dw^i}$$

is a basis for the tangent space. The differential operators provide a $$B = \{e_1 = \partial_1, \ldots, e_D = \partial_D\} \quad (20)$$

with $$\partial_i := \frac{\partial}{\partial w_i}. \quad (21)$$

These local differential operators can be be thought of as local perturbation operators which carry information about how infinitesimal weight changes impact the functional performance of a network. Formally, the Riemannian metric, g, then, defines an inner, $\langle e_i, e_j \rangle_{g_w}$ product within the tangent plane.

$$g_w: T_w W \times T_w W \to \mathbb{R} \quad (22)$$

$$\langle u, v \rangle_{g_w} = \sum_{ij} g_{ij} u_i v_j.$$

The inner product of a tangent vector $\langle e_{ti}, e_j \rangle_{g_w}$ which quantifies the total change in functional performance can be calculated across all training examples given a perturbation. In the present formulation, of local damage the response of a neural network to weight perturbation is analyzed by calculating the squared length of tangent vectors which represent local functional perturbations using the metric tensor.

Affine Connections and Covariant Differentiation

To better describe the geometric objects on a manifold, the concept of differentiation on a manifold that is in independent of local charts is developed, that is, a derivative operator whose components transform like tensor is developed. In order to define a derivative operator, it is desirable to be able to compare vectors and tensors based at different points on the manifold. The machinery that is used is called "affine connection."

The affine connection $\nabla$ is a differential operator that allows the following to be defined:
the covariant derivative operator, $\nabla_X Y$, which provides a way to calculate differentials of
a vector field Y with respect to another vector field X;
the parallel transport $\pi_c^\nabla$ which defines a way to transport vectors on tangent planes along any smooth curve c;
the notion of $\nabla$-geodesic $\gamma_\nabla$ which are defined as autoparallel curves, thus extending the ordinary notion of Euclidean straightness; and
the intrinsic curvature and torsion of the manifold.

A connection on a differentiable manifold can be be defined.

Connection:
Let $E \to M$ be a smooth vector bundle over a differentiable manifold M. Denote the space of smooth sections of E by $\Gamma(E)$. A connection of E is a linear map $$\nabla: \Gamma(E) \to \Gamma(E \otimes T^*(M)) \quad (23)$$

such that $$\nabla(\sigma f) = (\nabla \sigma) f + \sigma \otimes df. \quad (24)$$

Affine Connection:
Let M be a smooth manifold and let $\Gamma(TM)$ be the space of vector fields on M. The affine connection on M is a bilinear map $$\Gamma(TM) \times \Gamma(TM) \to \Gamma(TM), \quad (25)$$

which maps $$(X, Y) \mapsto \nabla_X Y. \quad (26)$$

Tangent Bundle:
The tangent bundle of M is defined as the union of all tangent spaces:

$$TM := \bigcup_p T_p = \{(p, v), \, p \in M, \, v \in T_p\} \quad (27)$$

A tangent vector v plays the role of a directional derivative, with vf meaning the derivative of a smooth function f along the direction v. A smooth vector field X is defined as a cross-section of the tangent bundle.

Riemannian Metric Connection:
A special case of the metric connection, a given connection is Riemannian if and only if $$\nabla_X (g(Y, Z)) = g(\nabla_X Y, Z) + g(Y, \nabla_X Z). \quad (28)$$

Covariant Derivative

Some concept of differentiation on a manifold that is chart independent can be defined. A derivative operator whose components transform like a tensor is desired.

In an arbitrary basis $\{e_\mu\}$, $\nabla_{e_\mu}$ is a map taking $e_\mu$ to some vector field.

$$\nabla_{e_\mu} e_\nu \equiv \nabla_\mu e_\nu. \quad (29)$$

Since this is a vector field for each $e_\mu$, $\nabla_{e_\mu} e_\nu$ can be written as a linear combination of basis vectors $$\nabla_\mu e_\nu = \Gamma^\lambda_{\nu\mu} e_\lambda. \quad (30)$$

where $\Gamma_{\nu\mu}^\lambda$ are the connection coefficients and are not the components of a tensor.

Write $X = X^\mu e_\mu$, $Y = Y^\mu e_\mu$, which gives $$\nabla_X Y = (\nabla_X Y)^\mu e_\mu \quad (31)$$

$$= \nabla_X (Y^\mu e_\mu)$$

$$= (\nabla_X Y^\mu) e_\mu + Y^\mu \nabla_X e_\mu$$

$$= X(Y^\mu) e_\mu + Y^\mu \nabla_{X^\nu e_\nu} e_\mu$$

$$= X^\nu e_\nu Y^\mu e_\mu + Y^\mu X^\nu \nabla_\nu e_\mu$$

$$= e_\nu Y^\mu X^\nu e_\mu + Y^\mu X^\nu \Gamma^\lambda_{\nu\mu} e_\mu$$

$$= e_\nu Y^\mu X^\nu e_\mu + Y^\lambda X^\nu \Gamma^\mu_{\lambda\nu} e_\mu$$

To see how $\Gamma_{\mu\nu}{}^\lambda$ transform under a coordinate transformation, the user can look at $$\nabla_{e_{\mu'}} e'_\nu = \Gamma^{\lambda'}_{\nu'\mu'} e_{\lambda'} = \Gamma^{\lambda'}_{\nu'\mu'} \Lambda^\alpha_{\lambda'} e_\alpha, \tag{32}$$

which gives $$\nabla_{e_{\mu'}} e'_\nu = \nabla_{\Lambda^\alpha_{\mu'} e_\alpha} \left(\Lambda^\beta_{\nu'} e_\beta\right) + \Lambda^\alpha_{\mu'} \Lambda^\beta_{\nu'} \nabla_\alpha e_\beta \tag{33}$$

$$= \nabla_{\Lambda^\alpha_{\mu'} e_\alpha} \left(\Lambda^\beta_{\nu'} e_\beta\right) + \Lambda^\alpha_{\mu'} \Lambda^\beta_{\nu'} \Gamma^\lambda_{\beta\alpha} e_\lambda$$

$$= \nabla_{\Lambda^\beta_{\mu'} e_\beta} \left(\Lambda^\beta_{\nu'} e_\beta\right) + \Lambda^\alpha_{\mu'} \Lambda^\beta_{\nu'} \Gamma^\alpha_{\lambda\beta} e_\alpha.$$

It follows from the above derivation that $$\Gamma^{\lambda'}_{\nu'\mu'} \Lambda^\alpha_{\lambda'} = \lambda^\beta_{\mu'} e_\beta (\Lambda^\alpha_{\nu'}) + \Lambda^\lambda_{\mu'} \Lambda^\beta_{\nu'} \Gamma^\alpha_{\beta\lambda}. \tag{34}$$

Note also that $$\Gamma_{\nu'\mu'}{}^{\lambda'} \Lambda_\lambda{}^\alpha \Lambda_\alpha{}^{\gamma'} = \Lambda_\alpha{}^{\gamma'} \lambda_\mu{}^\beta e_\beta (\Lambda_{\nu'}{}^\alpha) + \Lambda_\alpha{}^{\gamma'} \Lambda_\mu{}^\lambda \Lambda_{\nu4}{}^\beta \Gamma_{\beta\lambda}{}^\alpha. \tag{35}$$

Since $\Lambda_\lambda{}^\alpha \Lambda^{\gamma'}\alpha = \delta_\gamma{}^{\gamma'}$, the following is obtained $$\Gamma_{\nu'\mu'}{}^{\gamma'} = \Lambda_\alpha{}^{\gamma'} \lambda_\mu{}^\beta e_{62} (\Lambda_{\nu'}{}^\alpha) + \Lambda_\alpha{}^{\gamma'} \Lambda_\mu{}^\lambda \Lambda_{\nu4}{}^\beta \Gamma_{\beta\lambda}{}^\alpha. \tag{36}$$

Let $\nabla, \tilde{\nabla}$ be two connections on M. The difference $$D(X, Y) = \nabla_X Y - \tilde\nabla_X Y. \tag{37}$$

is always a tensor.

As discussed above, break-down acceleration for curved path can be analyzed using covariant derivative, $\nabla_{\gamma(t)} v(t)$.

Consider a point P and a neighboring point Q on the damage manifold, where Q is at a parameter distance $\Delta t$ from P along curve $\gamma$. Let $v(t)$ and $v(t+\Delta t)$ be members of the vector field at P and Q. A new vector field $v_0$ can be defined which equals $v(t)$ at Q and is parallel-transported along $\gamma$. The covariant derivative of $v(t)$ at P can be expressed as $$\nabla_{\gamma(t)} v(t) = \lim_{\Delta t \to 0} \frac{v_0(t) - v(t)}{\Delta t}. \tag{38}$$

Break-down acceleration can also be calculated conveniently from the definition of the Riemannian metric as an inner product by considering a path, $\gamma(t) \in W$, $t \in [0,1]$ and velocity vectors $$\left.\frac{d\gamma}{dt}\right|_{t=t'} = v(t)$$

calculated at different points in time. The break-down speed is defined along the path as the inner product of the tangent vector $$s = \langle v, v \rangle = \sum_{i=1, j=1}^n v_i v_j g_{ij}. \tag{39}$$

It is noted that speed is typically defined as $\sqrt{\langle v, v \rangle}$ but speed is defined as above due to the squared loss function which differs from the traditional euclidean distance that provides the convention for speed.

In the present definition, acceleration is $$\frac{ds}{dt} = \frac{dg_{ij}}{dt} + 2v_i \frac{dv_j}{dt} \tag{40}$$

$$= \frac{dg_{ij}}{dx_k} v + 2v_i \frac{dv_j}{dt}.$$

Finding Geodesics

On the damage manifold, there is a need to develop a generalization of a straight line in a flat space. In curved spaces, a geodesic is a path that parallel transports its own tangent vectors.

For two distinct points P and Q on the damage manifold M, the geodesic connecting P and Q is defined to be the curve with minimal arclength that passes through both points. More rigorously, it satisfies the geodesic equation below.

Geodesic Equation:

$$\nabla_\lambda T^\mu = \frac{dT^\mu}{d\lambda} + \Gamma^\mu_{\gamma\nu} T^\nu \frac{dx^\gamma}{d\lambda} \tag{41}$$

To find geodesic recovery paths on W, the geodesic equation given by Equation 42 can be solved:

$$\frac{d^2 w^\eta}{dt^2} + \Gamma^\eta_{\mu\nu} \frac{dw^\mu}{dt} \frac{dw^\nu}{dt} = 0, \tag{42}$$

where, $w^j$ defines the jth basis vector of the weights space W, $\Gamma_{\mu\nu}{}^\eta$ specifies the Christoffel symbols $$\left(\Gamma^\eta_{\mu\nu} = \Sigma_r \frac{1}{2} g^{-1}_{\eta r} \left(\frac{\partial g_{r\mu}}{\partial x^\nu} + \frac{\partial g_{r\nu}}{\partial x^\mu} - \frac{\partial g_{\mu\nu}}{\partial x^r}\right)\right)$$

on the manifold. The Christoffel symbols capture infinitesimal changes in the metric tensor (g) along a set of directions in the manifold. They are computed by setting the covariant derivative of the metric tensor along a path specified by $\gamma(t)$ to zero. Specifically, geodesic paths, $\gamma(t)$, can be computed so that $\gamma(0) = w_t$ and $\gamma(1) \in W_d$ where $W_d$ is the damage hyper-plane. The damage hyper-plane is the set, $W_d = \{w_i = 0, \forall i \in n_{damage}\} \subset W$, of all networks that are consistent with a given configuration of weight damage. Thus, paths can be found through weight space that achieve a given configuration of damage while maximizing network performance.

As the computation of the Christoffel symbols is both memory and computationally intensive, an optimization algorithm is described herein to evaluate the 'approximate' geodesic in the manifold.

Given a trained network, the method updates the weights of the network to optimize performance given a direction of damage. To discover a geodesic path $\gamma(t)$, the method can begin at a trained network and iteratively solve for the tangent vector, $\theta(w)$, at every point, $w = \gamma(t)$, along the path, starting from $w_t$ and terminating at the damage hyperplane, $W_d$. The damage hyperplane is the set of all networks, $w \in W$, such that $w_i = 0$, for $i \in n_{damaged}$. Specifically, the following is solved $$\operatorname{argmin}_{74_{\_(w)}} \langle \theta(w), \theta(w) \rangle_w - \beta \theta(w)^T v_w \quad \text{subject to:} \quad \theta(w)^T \theta(w) \le 0.01. \tag{43}$$

The tangent vector θ(w) can be obtained by simultaneously optimizing two objective functions: (1) minimizing the increase in functional distance along the path measured by the metric tensor ($g_w$) [min: $\langle \theta(w), \theta(w) \rangle_w = (\theta(w)^T g_w \theta(w))$] and (2) maximizing the dot-product between the tangent vector and $v_w$, vector pointing in the direction of the hyperplane [max: $(\theta(w)^T v_w)$] to enable movement towards the damage hyperplane.

For small networks (with a small number of parameters), the tangent vector of the curved path in the manifold can be evaluated by re-evaluating the metric tensor along discrete steps on the manifold. However, as the metric tensor scales as a square of the number of parameters in the network, the estimation of the metric tensor can be memory intensive for a large network (like VGG-11) with 128 million parameters. The method can find 'approximate' geodesic paths for larger networks, that traverses from a well-trained network to networks on a specified damage hyperplane is stated in terms of an optimization method elaborated below:

Taylor Expansion of Loss Function:

$$L(w + \Delta w) \sim L(w) + \sum_{i=1}^{n} \left( \frac{\partial L^T}{\partial w^i} \Delta w^i \right), \tag{44}$$

where, $$\frac{\partial L}{\partial w^i}$$

is the gradient of the loss function wrt parameters of the network.

The following are optimized:

$$\text{minimize} \sum_{i=1}^{n} \left( \frac{\partial L^T}{\partial w^i} \Delta w^i \right) \tag{45}$$

$$\text{maximize} \; \Delta w^T v_w \tag{46}$$

$$\text{Constrain:} \; \Delta w^T \Delta w = 1 \tag{47}$$

Combining the 2 functions to be optimized along with the constraint using Lagrangian multiplier formulation:

$$\mathcal{L}(\Delta w, \mu|\beta) := \sum_{i=1}^{n} \left( \frac{\partial L^T}{\partial w^i} \Delta w^i \right) - \beta(\Delta w^T v) + \mu(\Delta w^T \Delta w - 1), \tag{48}$$

$v_w$ is the direction pointing towards the damage hyper-plane of interest.

Solving the lagrange equations:

$$\frac{\partial \mathcal{L}(\Delta w, \mu|\beta)}{\partial \Delta w} = 0$$
$$\frac{\partial \mathcal{L}(\Delta w, \mu|\beta)}{\partial \mu} = 0, \tag{49}$$

which gives:

$$\frac{\partial \mathcal{L}(\Delta w, \mu|\beta)}{\partial \Delta w} = \frac{\partial \mathcal{L}}{\partial w} - \beta v_w + 2\mu \Delta w = 0 \tag{50}$$

$$\Delta w = \frac{\left(\beta v - \frac{\partial L}{\partial w}\right)}{2\mu}$$

Substitute in second equation to evaluate μ:

$$\frac{\partial \mathcal{L}(\Delta w, \mu|\beta)}{\partial \mu} = \Delta w^T \Delta w = 1 \tag{51}$$

$$\mu = \frac{\left(\left(\beta v - \frac{\partial L}{\partial w}\right)^T \left(\beta v - \frac{\partial L}{\partial w}\right)\right)^{\frac{1}{2}}}{2}$$

For the paths evaluated above, β is 0.1; and a learning rate that varies between 0.001 to 0.1. In some embodiments, β can be, or be about, 0.01, 0.02, 0.03, 0.04, 0.05, 0.1, 0.2, 0.3, 0.4, 0.5, 0.6, 0.7, 0.8, 0.9, or more. In some embodiments, the learning rate can be, or be about, 0.001, 0.002, 0.003, 0.004, 0.005, 0.01, 0.02, 0.03, 0.04, 0.05, 0.1, 0.2, 0.3, 0.4, 0.5, 0.6, 0.7, 0.8, 0.9, or more.

In FIG. 4A-FIG. 4F, geodesic paths from a trained VGG-11 network to a pre-defined damage hyperplane were evaluated. Here, geodesic paths from a trained MLP network to a damage hyperplane are depicted in FIG. 7A-FIG. 7C, to demonstrate the algorithms' applicability to multiple neural network architectures.

Figure 7A:
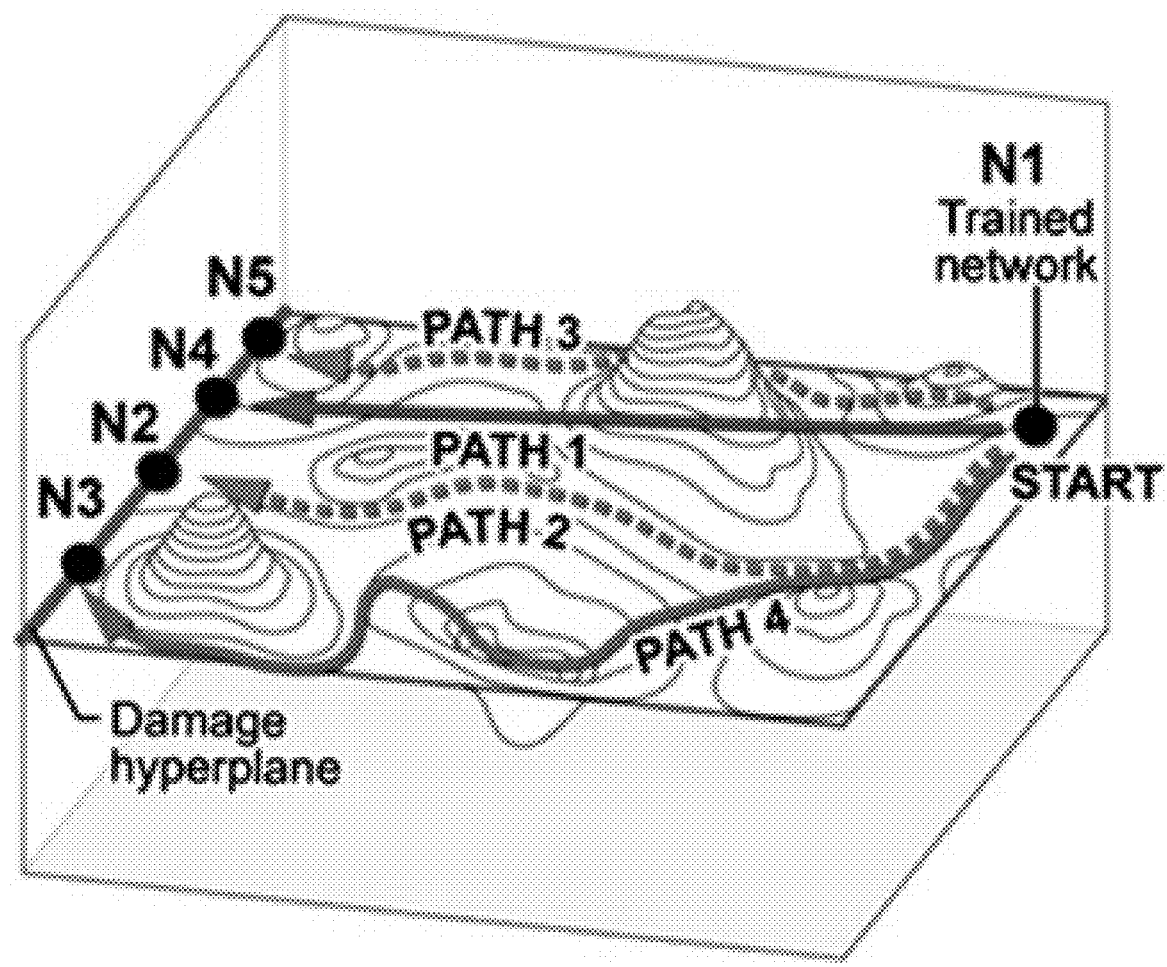
FIG. 7A-FIG. 7C show geodesic paths allow damage compensation through weight adjustment.
Figure 7B:
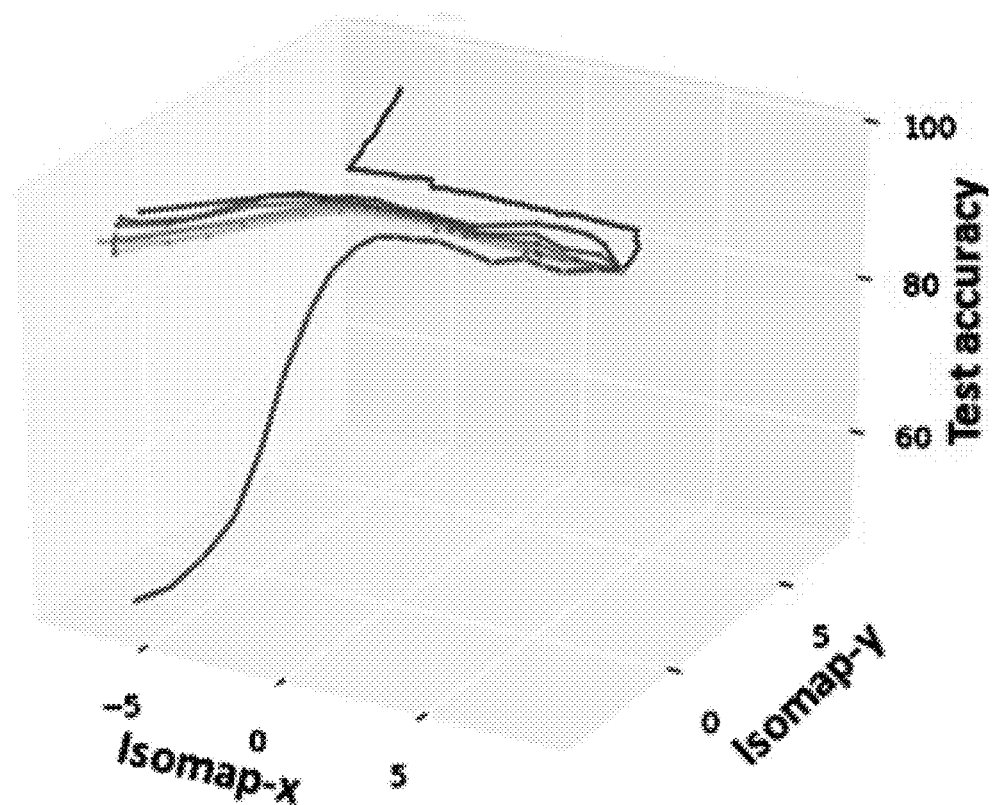
Figure 7C:
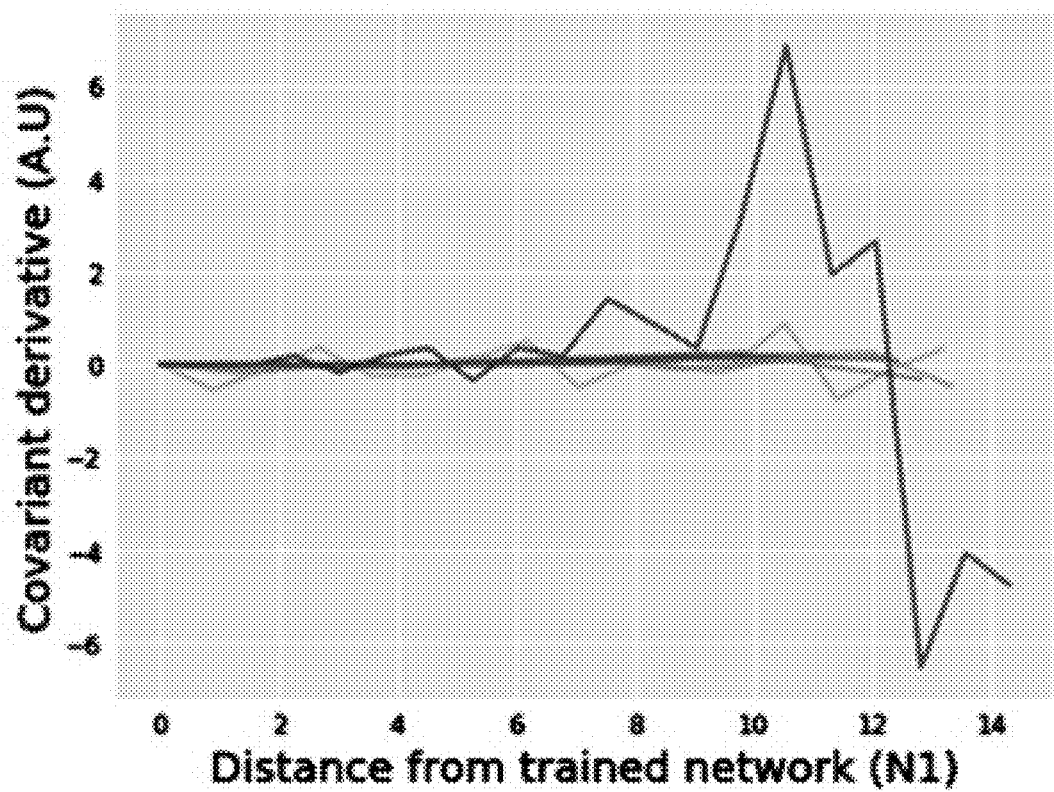

FIG. 7A-FIG. 7C show geodesic paths allow damage compensation through weight adjustment: FIG. 7A shows multiple recovery paths on the loss landscape from trained network (N1) to networks on the damage hyper-plane (N2, N3, N4, N5). The z-axes is network-loss, while the x,y axes are neural net weights. FIG. 7B shows test accuracy of geodesic recovery paths (blue) versus naive damage paths (red) for MLP-2 network while 250 nodes from hidden-layer 1 and 50 nodes from hidden-layer 2 are damaged. While the naive path exhibits sharp break-down, the geodesic method adjusts undamaged weights to maintain test accuracy. FIG. 7C shows magnitude of the covariant derivative (break-down acceleration) for geodesic (blue) and naive damage paths (red).

Neural Network Architectures

Throughout the present disclosure, two types of neural networks have been used: (i) Multi-layer perceptrons (MLP) and (ii) Convolutional neural networks (CNN). Both, the MLP and CNN networks use ReLU non-linearities while forward-propagating inputs through the network.

Multi-layer Perceptrons (MLP)

Two variants of MLP's were used: (i) MLP with 1 hidden layer, referred to as MLP-1, (ii) MLP with 2 hidden layers, referred to as MLP-2. The MLP's are trained to perform image classification on MNIST.

TABLE 1

MULTI-LAYER PERCEPTRONS

| Neural network name | Neural network architecture | Optimization algorithm hyperparameters | Additional notes |
|---|---|---|---|
| | 784-100-10 | Stochastic gradient descent (learning rate = 0.01, momentum = 0.9, batch-size = 4) | MLP-1 is a multi-layer perceptron with 1 hidden layer and variable number of hidden nodes |
| | 784-400-10 | | |
| | 784-800-10 | | |
| | 784-1200-10 | | |
| MLP-2 | 784-300-100-10 | Stochastic gradient descent (learning rate = 0.01, momentum = 0.9, batch-size = 4) | MLP-2 refers to a multi-layer perceptron with 2 hidden layers, commonly referred to as LeNet |

Convolutional Neural Network

VGG-11 was used with batch-norm to perform image classification on CIFAR-10. A pre-trained VGG-11 model on CIFAR-10 with batch-norm was obtained for analysis.

TABLE 2

CONVOLUTIONAL NEURAL NETWORK

| Neural network name | Neural network architecture | Optimization algorithm hyperparameters | Additional notes |
|---|---|---|---|
| CNN | VGG-11 | Stochastic gradient descent (learning rate = 1e−4, momentum = 0.9, batch-size = 60), trained with batch-norm | VGG-11 is a 11 layered convolutional neural network, that has a total of 128 million parameters. |

Although the methods, approaches, algorithms, frameworks, and mathematical formulations and derivations herein are described with reference to a neural network, it is for illustration only and is not intended to be limiting. The methods, approaches, algorithms, frameworks, and mathematical formulations and derivations herein can be applied to a machine learning model in general.

Damage Recovery of Machine Learning Models

Disclosed herein include methods for updating weights of a machine learning model. Any of the methods for updating weights of a machine learning model can be performed by or using the computing device 800 described with reference to FIG. 8. In some embodiments, a method for updating weights of a machine learning model comprises: providing (or receiving) a machine learning model (e.g., a neural network) comprising a plurality of weights. The method can comprise: determining one or more weights of the plurality of weights (and/or one or more nodes of a plurality of nodes) of the machine learning model are damaged. The method can comprise: determining first updated weights corresponding to one or more weights of the plurality of weights of the machine learning model that are undamaged using a geodesic path in a weight space comprising the plurality of weights of the machine learning model. The method can comprise: updating the weights that are undamaged with the first updated weights to generate a first updated machine learning model.

In some embodiments, a method for updating weights of a machine learning model (e.g., a neural network) comprises: providing (or receiving) a machine learning model comprising a plurality of weights. One or more weights of the plurality of weights of the machine learning model can be damaged. Alternatively or additionally, one or more nodes of a plurality of nodes of the machine learning model can be damaged. The method can comprise: determining first updated weights corresponding to one or more weights of the plurality of weights of the machine learning model that are undamaged using a geodesic path in a weight space comprising the plurality of weights of the machine learning model. The method can comprise: updating the weights that are undamaged with the first updated weights to generate a first updated machine learning model.

In some embodiments, a method for updating weights of a machine learning model (e.g., a neural network) comprises: providing (or receiving) a machine learning model comprising a plurality of weights. One or more first weights of the plurality of weights of the machine learning model can be damaged. Alternatively or additionally, one or more first nodes of a plurality of nodes of the machine learning model can be damaged. The method can comprise: determining first updated weights corresponding to one or more weights of the plurality of weights of the machine learning model that are undamaged using a geodesic path in a weight space comprising the plurality of weights of the machine learning model. The method can comprise: updating the weights of the machine learning model that are undamaged with the first updated weights to generate a first updated machine learning model. Second weights of the plurality of weights of the first updated machine learning model may be damaged. Alternatively or additionally, one or more second nodes of the plurality of nodes of the machine learning model can be damaged. The method can comprise: determining second updated weights corresponding to one or more weights of the plurality of weights of the first updated machine learning model that are undamaged using a geodesic path in the weight space. The method can comprise:

updating the weights of the first updated machine learning model that are undamaged with the second updated weights to generate a second updated machine learning model.

In some embodiments, determining the first updated weights (or any updated weights of the present disclosure) comprises determining the geodesic path using a geodesic equation. In some embodiments, determining the first updated weights (or any updated weights of the present disclosure) comprises determining an approximation of the geodesic path using an approximation of the geodesic equation. The approximation of the geodesic equation can comprise a first order expansion of a loss function, optionally wherein the first order expansion comprises a Taylor expansion. Determining the first updated weights (or any updated weights of the present disclosure) can comprises determining the approximation of the geodesic equation using a metric (or a metric tensor). The metric can comprise a Riemannian metric, a pseudo-Riemannian metric, or a non-Euclidean metric. The combination of the weight space and the metric can comprise a Riemannian manifold or a pseudo-Riemannian manifold. The metric can comprise a positive semi-definite, symmetric matrix or a positive definite, symmetric matrix. The metric tensor can comprise a symmetric matrix, wherein the metric tensor is definite or semi-definite, wherein the metric is bilinear, and/or wherein the metric tensor is positive, or a combination thereof. The weight space can comprise a manifold, wherein the weight space comprises a smooth manifold, and/or wherein the weight space is homeomorphic to a Euclidean space.

In some embodiments, determining the first updated weights (or any updated weights of the present disclosure) comprises: determining a plurality of approximations of the geodesic path using an approximation of the geodesic equation. Determining the first updated weights (or any updated weights of the present disclosure) can comprise: selecting one of the plurality of approximations of the geodesic path as a best approximation of the geodesic path. The best approximation of the geodesic path can have a shortest total length amongst the plurality of approximations of the geodesic path to a damage hyperplane.

In some embodiments, the method comprises, prior to determining the one or more weights are damaged (or determining the one or more nodes are damaged): receiving a first input. The method can comprise: determining a first output from the first input using the machine learning model. In some embodiments, determining the first output from the first input using the machine learning model (or any output from any input using any machine learning model of the present disclosure)) corresponds to a task. The task comprises a computation processing task, an information processing task, a sensory input processing task, a storage task, a retrieval task, a decision task, an image recognition task, and/or a speech recognition task. In some embodiments, the first input comprises an image. The task can comprise an image recognition task.

In some embodiments, the method comprises, subsequent to updating the weights that are undamaged with the first updated weights: receiving a second input. The method can comprise: determining a second output from the second input using the first updated machine learning model.

In some embodiments, determining the first updated weights and updating the weights that are undamaged with the first updated weights are performed iterative a number of iterations (or epochs), such as 2, 3, 4, 5, 6, 7, 8, 9, 10, 15, 20, 25, 30, 35, 40, 45, 50, or more iterations (or epochs). In some embodiments, the method comprises, subsequent to subsequent to updating the weights that are undamaged with the first updated weights: determining second updated weights corresponding to second weights of the plurality of weights of the machine learning model that are undamaged using the geodesic path in the weight space. The method can comprise: updating the second weights that are undamaged with the second updated weights to generate a second updated machine learning model. In some embodiments, the second updated machine learning model (or any machine learning model of the present disclosure) is on a damage hyperplane. In some embodiments, the first updated machine learning model (or any machine learning model of the present disclosure) is on a damage hyperplane. In some embodiments, the method comprises, subsequent to updating the second weights that are undamaged with the second updated weights: receiving a third input. The method can comprise: determining a third output from the third input using the second updated machine learning model.

In some embodiments, the machine learning model when provided comprises no weight that is damaged. In some embodiments, the machine learning model when provided comprises at least one weight that is damaged. The number of weights damaged can be or be about, for example, 2, 3, 4, 5, 6, 7, 8, 9, 10, 20, 30, 40, 50, 100, 200, 300, 400, 500, 1000, 2000, 3000, 4000, 5000, 10000, or more or less. The percentage of weights that are damaged can comprise at least 5% (or 0.01%, 0.02%, 0.03%, 0.04%, 0.05%, 1%, 2%, 3%, 4%, 5%, 10%, 15%, 20%, 25%, 30%, 40%, 50%, or more or less) of the plurality of weights of the machine learning model. In some embodiments, one or more of the one or more weights have values other than zeros when undamaged. In some embodiments, one or more the one or more weights have values of zeros when damaged. In some embodiments, the method comprises setting the weights that are damaged to values of zeros. The number of nodes damaged can be or be about, for example, 2, 3, 4, 5, 6, 7, 8, 9, 10, 20, 30, 40, 50, 100, 200, 300, 400, 500, 1000, 2000, 3000, 4000, 5000, 10000, or more or less. The percentage of nodes that are damaged can comprise at least 5% (or 0.01%, 0.02%, 0.03%, 0.04%, 0.05%, 1%, 2%, 3%, 4%, 5%, 10%, 15%, 20%, 25%, 30%, 40%, 50%, or more or less) of the plurality of nodes of the machine learning model.

In some embodiments, an accuracy of the machine learning model comprising no weight that is damaged is at least 90% (or at least 70%, 75%, 80%, 85%, 90%, 95% or more or less). In some embodiments, an accuracy of the machine learning model comprising the weights that are damaged is at most 80% (or at most 10%, 20%, 30%, 40%, 50%, 60%, 70%, 80% or more or less). In some embodiments, an accuracy of the machine learning model comprising the weights that are damaged is at most 90% (or at least 70%, 75%, 80%, 85%, 90%, 95% or more or less) of an accuracy of the machine learning model comprising no weight that is damaged. In some embodiments, an accuracy of the first updated machine learning model is at least 85% (or at least 70%, 75%, 80%, 85%, 90%, 95% or more or less). In some embodiments, an accuracy of the machine learning model comprising the weights that are damaged is at most 90% (or at least 70%, 75%, 80%, 85%, 90%, 95% or more or less) of an accuracy of the first updated machine learning model. In some embodiments, an accuracy of the first updated machine learning model is at most 99% (or 85%, 90%, 95%, 96%, 97%, 98%, 99%, 99.9%, or more or less) of an accuracy of the second updated machine learning model. The number of the weights of the plurality of weights of the machine learning model that are damaged can be or be about, for example, 2, 3, 4, 5, 6, 7, 8, 9, 10, 20, 30, 40, 50, 100, 200, 300, 400, 500, 1000, 2000, 3000, 4000, 5000, 10000 or more or less. The weights of the plurality of weights of the machine learning model that are damaged can comprise at least 5% (or 0.01%, 0.02%, 0.03%, 0.04%, 0.05%, 1%, 2%, 3%, 4%, 5%, 10%, 15%, 20%, 25%, 30%, 40%, 50%, or more or less) of the plurality of weights of the machine learning model.

In some embodiments, the machine learning model (or a layer of the machine learning model) comprises at least 100 weights (or at least 50, 100, 200, 300, 400, 500, 1000, 2000, 3000, 4000, 5000, 10000, 20000, 30000, 40000, 100000, or more or less, weights). In some embodiments, the machine learning model (or a layer of the machine learning model) comprises at least 25 nodes (or 20, 25, 30, 40, 50, 100, 200, 300, 400, 500, 1000, 2000, 3000, 4000, 10000, or more or less, nodes). In some embodiments, the machine learning model comprises at least 2 layers (or at least 2, 3, 4, 5, 6, 7, 8, 9, 10, 20, 30, 40, 50, 100, 200, 300, 400, 500, or more or less). In some embodiments, the machine learning model comprises a convolutional machine learning model (CNN), a deep machine learning model (DNN), a multilayer perceptron (MLP), or a combination thereof.

Machine Learning Models

Resilience determination and/or damage recovery can be performed on machine learning models. A machine learning model can be, for example, a neural network (NN), a convolutional neural network (CNN), a deep neural network (DNN), or a multilayer perceptron. The computing device 800 described with reference to FIG. 8 can determine resiliency of a machine learning model and/or update weights of a damaged machine learning model (e.g., with damaged weights and/or damaged nodes).

A layer of a neural network (NN), such as a deep neural network (DNN) can apply a linear or non-linear transformation to its input to generate its output. A neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

A convolutional neural network (CNN) can be a NN with one or more convolutional layers, such as, 5, 6, 7, 8, 9, 10, or more. The convolutional layer can apply a set of kernels that convolve its input to generate its output. The softsign layer can apply a softsign function to its input. The softsign function (softsign(x)) can be, for example, $(x/(1+|x|))$. The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if x≥0 and $\alpha x$ if x<0, where $\alpha$ is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof The number of layers in the NN can be different in different implementations. For example, the number of layers in a NN can be 10, 20, 30, 40, or more. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. Outputs of NNs of the plurality of NNs can be computed to determine an output of the NN. For example, an output of a NN of the plurality of NNs can include a likelihood score. The output of the NN including the plurality of NNs can be determined based on the likelihood scores of the outputs of different NNs of the plurality of NNs.

Non-limiting examples of machine learning models includes scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

Some examples of machine learning models can include supervised or non-supervised machine learning, including regression models (such as, for example, Ordinary Least Squares Regression), instance-based models (such as, for example, Learning Vector Quantization), decision tree models (such as, for example, classification and regression trees), Bayesian models (such as, for example, Naive Bayes), clustering models (such as, for example, k-means clustering), association rule learning models (such as, for example, a-priori models), artificial neural network models (such as, for example, Perceptron), deep learning models (such as, for example, Deep Boltzmann Machine, or deep neural network), dimensionality reduction models (such as, for example, Principal Component Analysis), ensemble models (such as, for example, Stacked Generalization), and/or other machine learning models.

Execution Environment

Figure 8:
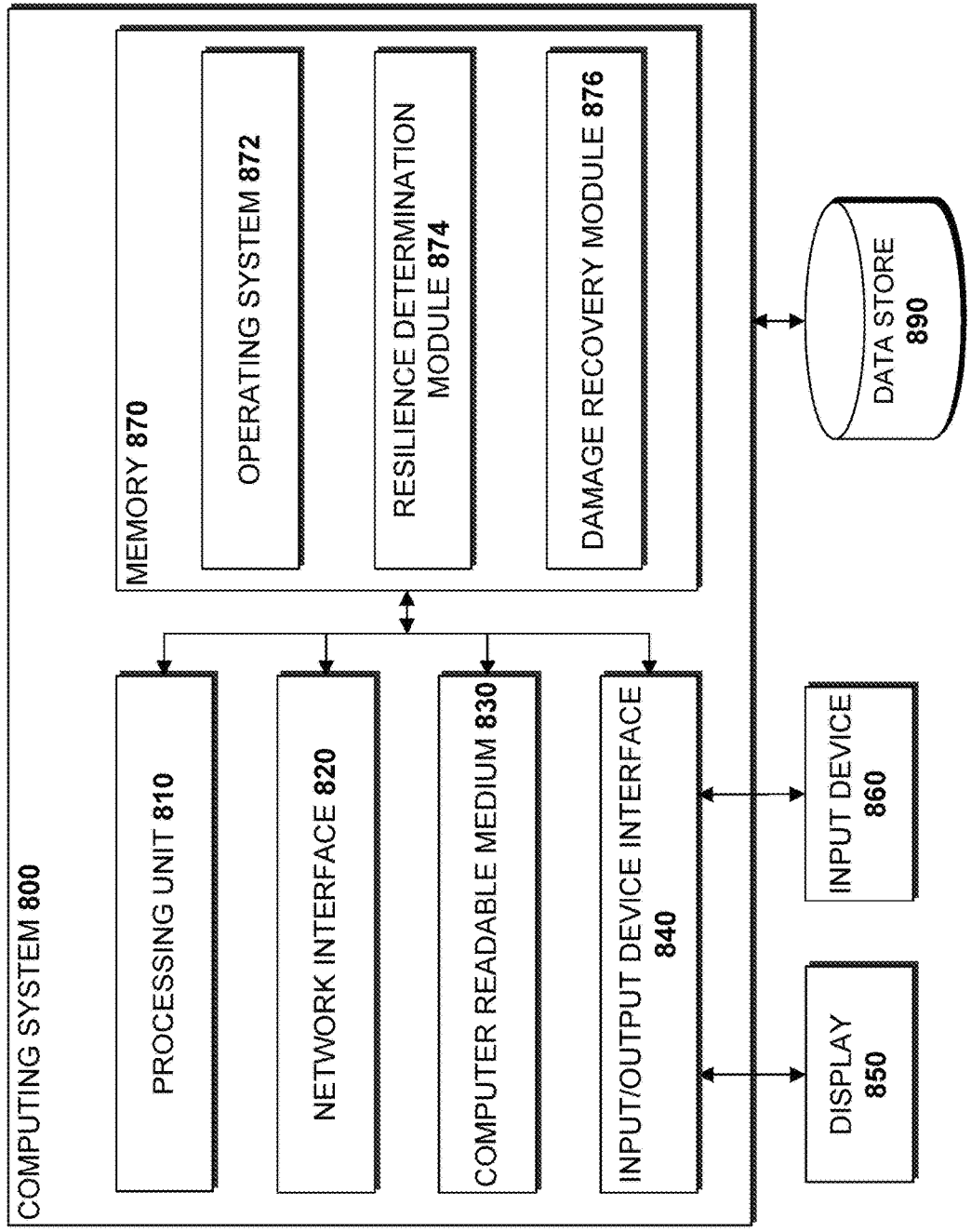
FIG. 8 is a block diagram of an illustrative computing system configured to determine resilience of a machine learning model (e.g., a neural network) and/or determine updated weights of a damaged machine learning model.

FIG. 8 depicts a general architecture of an example computing device 800 configured for resilience determination and/or damage recovery. The general architecture of the computing device 800 depicted in FIG8. 8 includes an arrangement of computer hardware and software components. The computing device 800 may include many more (or fewer) elements than those shown in FIG. 8. It is not necessary, however, that all of these generally conventional elements be shown in order to provide an enabling disclosure. As illustrated, the computing device 800 includes a processing unit 810, a network interface 820, a computer readable medium drive 830, an input/output device interface 840, a display 850, and an input device 860, all of which may communicate with one another by way of a communication bus. The network interface 820 may provide connectivity to one or more networks or computing systems. The processing unit 810 may thus receive information and instructions from other computing systems or services via a network. The processing unit 810 may also communicate to and from memory 870 and further provide output information for an optional display 850 via the input/output device interface 840. The input/output device interface 840 may also accept input from the optional input device 860, such as a keyboard, mouse, digital pen, microphone, touch screen, gesture recognition system, voice recognition system, gamepad, accelerometer, gyroscope, or other input device.

The memory 870 may contain computer program instructions (grouped as modules or components in some embodiments) that the processing unit 810 executes in order to implement one or more embodiments. The memory 870 generally includes RAM, ROM and/or other persistent, auxiliary or non-transitory computer-readable media. The memory 870 may store an operating system 872 that provides computer program instructions for use by the processing unit 810 in the general administration and operation of the computing device 800. The memory 870 may further include computer program instructions and other information for implementing aspects of the present disclosure.

For example, in one embodiment, the memory 870 includes a resilience determination module 874 for determining resiliency of a machine learning model (e.g., a neural network). The memory 870 may additionally or alternatively include a damage recovery module 876 for determining and updating damaged weights. In addition, memory 870 may include or communicate with the data store 890 and/or one or more other data stores that store a machine learning model (e.g., a neural network) with or without damaged weights and/or a machine learning model with updated weights.

Additional Considerations

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

One skilled in the art will appreciate that, for this and other processes and methods disclosed herein, the functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As used in this specification and the appended claims, the singular forms "a," "an," and "the" include plural references unless the context clearly dictates otherwise. Accordingly, phrases such as "a device configured to" are intended to include one or more recited devices. Such one or more recited devices can also be collectively configured to carry out the stated recitations. For example, "a processor configured to carry out recitations A, B and C can include a first processor configured to carry out recitation A and working in conjunction with a second processor configured to carry out recitations B and C. Any reference to "or" herein is intended to encompass "and/or" unless otherwise stated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g.," a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g.," a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

It will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for updating weights of a neural network comprising:
   under control of a hardware processor:
   (a) providing a neural network comprising a plurality of weights, wherein the neural network is executed on a device subject to memory error and/or physical component damage;
   (b) determining one or more weights of the plurality of weights of the neural network are damaged;
   (c) determining first updated weights corresponding to one or more weights of the plurality of weights of the neural network that are undamaged using a geodesic path in a weight space comprising the plurality of weights of the neural network; and
   (d) updating the weights that are undamaged with the first updated weights to generate a first updated neural network,
   wherein the first updated neural network is on a damage hyperplane.

2. The method of claim 1, wherein (c) comprises determining the geodesic path using a geodesic equation.

3. The method of claim 1, wherein (c) comprises determining an approximation of the geodesic path using an approximation of the geodesic equation, optionally wherein the approximation of the geodesic equation comprises a first order expansion of a loss function, optionally wherein the first order expansion comprises a Taylor expansion.

4. The method of claim 1, wherein the weight space comprises a manifold, wherein the weight space comprises a smooth manifold, and/or wherein the weight space is homeomorphic to a Euclidean space.

5. The method of claim 1, wherein (c) comprises:
   determining a plurality of approximations of the geodesic path using an approximation of the geodesic equation; and
   selecting one of the plurality of approximations of the geodesic path as a best approximation of the geodesic path, wherein the best approximation of the geodesic path has a shortest total length amongst the plurality of approximations of the geodesic path to a damage hyperplane.

6. The method of claim 1, comprising, prior to (b):
   receiving a first input; and
   determining a first output from the first input using the neural network.

7. The method of claim 1, comprising, subsequent to (d):
   receiving a second input; and
   determining a second output from the second input using the first updated neural network.

8. The method of claim 1, comprising, subsequent to (d):
   (c2) determining second updated weights corresponding to second weights of the plurality of weights of the neural network that are undamaged using the geodesic path in the weight space; and (d2) updating the second weights that are undamaged with the second updated weights to generate a second updated neural network.

9. The method of claim 8, comprising, subsequent to (d2):
   receiving a third input; and
   determining a third output from the third input using the second updated neural network.

10. The method of claim 1, wherein (c) and (d) are performed for at least two iterations.

11. The method of claim 1, wherein the neural network when provided comprises no weight that is damaged.

12. The method of claim 1, wherein one or more weights of the plurality of weights of the neural network have values of zeros when damaged.

13. The method of claim 1, comprising setting the weights that are damaged to values of zeros.

14. The method of claim 1, wherein an accuracy of the neural network comprising the weights that are damaged is at most 90% of an accuracy of the neural network comprising no weight that is damaged.

15. The method of claim 1, wherein an accuracy of the neural network comprising the weights that are damaged is at most 90% of an accuracy of the first updated neural network.

16. The method of claim 8, wherein an accuracy of the first updated neural network is at most 99% of an accuracy of the second updated neural network.

17. The method of claim 1, wherein the weights of the plurality of weights of the neural network that are damaged comprises at least 5% of the plurality of weights of the neural network.

18. The method of claim 1, whereinherein the neural network comprises a convolutional neural network (CNN), a deep neural network (DNN), a multilayer perceptron (MLP), or a combination thereof.

19. A system comprising:
   non-transitory memory configured to store executable instructions and a neural network comprising a plurality of weights, wherein the neural network is executed on a device subject to memory error and/or physical component damage; and
   a hardware processor in communication with the non-transitory memory, the hardware processor programmed by the executable instructions to perform:
   (a) determining first updated weights corresponding to one or more weights of the plurality of weights of the neural network that are undamaged using a geodesic path in a weight space comprising the plurality of weights of the neural network, wherein (a) comprises determining an approximation of the geodesic path using an approximation of a geodesic equation;
   (b) updating the weights of the neural network that are undamaged with the first updated weights to generate a first updated neural network, wherein subsequent to (b), second weights of the plurality of weights of the first updated neural network are damaged;
   (c) determining second updated weights corresponding to one or more weights of the plurality of weights of the first updated neural network that are undamaged subsequent to (b) using a geodesic path in the weight space; and
   (d) updating the weights of the first updated neural network that are undamaged with the second updated weights to generate a second updated neural network.

* * * * *